(12) United States Patent
Xian et al.

(10) Patent No.: US 11,562,234 B2
(45) Date of Patent: Jan. 24, 2023

(54) DYNAMICALLY DETERMINING SCHEMA LABELS USING A HYBRID NEURAL NETWORK ENCODER

(71) Applicant: Adobe Inc., San Jose, CA (US)

(72) Inventors: Yikun Xian, Edison, NJ (US); Tak Yeon Lee, San Jose, CA (US); Sungchul Kim, San Jose, CA (US); Ryan Rossi, Mountain View, CA (US); Handong Zhao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 444 days.

(21) Appl. No.: 16/751,755

(22) Filed: Jan. 24, 2020

(65) Prior Publication Data
US 2021/0232908 A1 Jul. 29, 2021

(51) Int. Cl.
*G06N 3/08* (2006.01)

(52) U.S. Cl.
CPC ..................... *G06N 3/08* (2013.01)

(58) Field of Classification Search
CPC .......... G06N 3/08; Y10S 707/99941
See application file for complete search history.

(56) References Cited

U.S. PATENT DOCUMENTS

2015/0356094 A1* 12/2015 Gorelik ............... G06F 16/2457 707/748
2016/0224626 A1* 8/2016 Robichaud ............. G06F 16/24
2020/0081899 A1* 3/2020 Shapur .................. G06F 16/211
2021/0224287 A1* 7/2021 Chaudhry ............... G06N 3/08

OTHER PUBLICATIONS

Kilias, Torsten, et al. "Idel: In-database entity linking with neural embeddings." arXiv preprint arXiv:1803.04884 (2018). (Year: 2018).*
Wu, Shengfeng, and Iulian Neamtiu. "Schema evolution analysis for embedded databases." 2011 IEEE 27th International Conference on Data Engineering Workshops. IEEE, 2011. (Year: 2011).*
Yao, Limin, Sebastian Riedel, and Andrew McCallum. "Universal schema for entity type prediction." Proceedings of the 2013 workshop on Automated knowledge base construction. 2013. (Year: 2013).*

(Continued)

*Primary Examiner* — Fayyaz Alam
(74) *Attorney, Agent, or Firm* — Keller Preece PLLC

(57) ABSTRACT

Systems, methods, and non-transitory computer-readable media are disclosed for dynamically determining schema labels for columns regardless of information availability within the columns. For example, the disclosed systems can identify a column that contains an arbitrary amount of information (e.g., a header-only column, a cell-only column, or a whole column). Additionally, the disclosed systems can generate a vector embedding for an arbitrary input column by selectively using a header neural network and/or a cell neural network based on whether the column includes a header label and/or whether the column includes a populated column cell. Furthermore, the disclosed systems can compare the column vector embedding to schema vector embeddings of candidate schema labels in a d-dimensional space to determine a schema label for the column.

20 Claims, 17 Drawing Sheets

(56) References Cited

OTHER PUBLICATIONS

Wang, Lanjun, et al. "Schema management for document stores." Proceedings of the VLDB Endowment 8.9 (2015): 922-933. (Year: 2015).*

Bernstein, Philip A., Jayant Madhavan, and Erhard Rahm. "Generic schema matching, ten years later." Proceedings of the VLDB Endowment 4.11 (2011): 695-701.

Rahm, Erhard, and Philip A. Bernstein. "A survey of approaches to automatic schema matching." the VLDB Journal 10.4 (2001): 334-350.

Madhavan, Jayant, Philip A. Bernstein, and Erhard Rahm. "Generic schema matching with cupid." vldb. vol. 1. 2001.

Melnik, Sergey, Hector Garcia-Molina, and Erhard Rahm. "Similarity flooding: A versatile graph matching algorithm and its application to schema matching." Proceedings 18th International Conference on Data Engineering. IEEE, 2002.

Hulsebos, Madelon, et al. "Sherlock: A Deep Learning Approach to Semantic Data Type Detection." KDD (2019).

Pham, Minh, et al. "Semantic labeling: a domain-independent approach." International Semantic Web Conference. Springer, Cham, 2016.

Zapilko, Benjamin, Matthaus Zloch, and Johann Schaible. "Utilizing regular expressions for instance-based schema matching." Proceedings of the 7th International Conference on Ontology Matching—vol. 946. CEUR-WS. org, 2012.

Deng, Dong, et al. "Scalable column concept determination for web tables using large knowledge bases." Proceedings of the VLDB Endowment 6.13 (2013): 1606-1617.

* cited by examiner

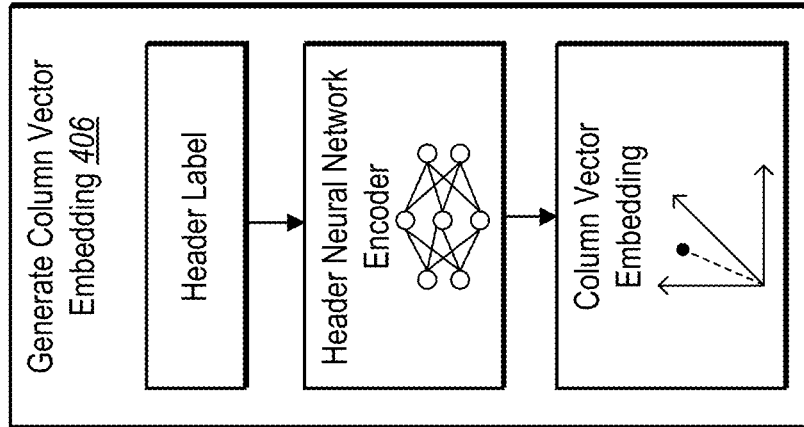
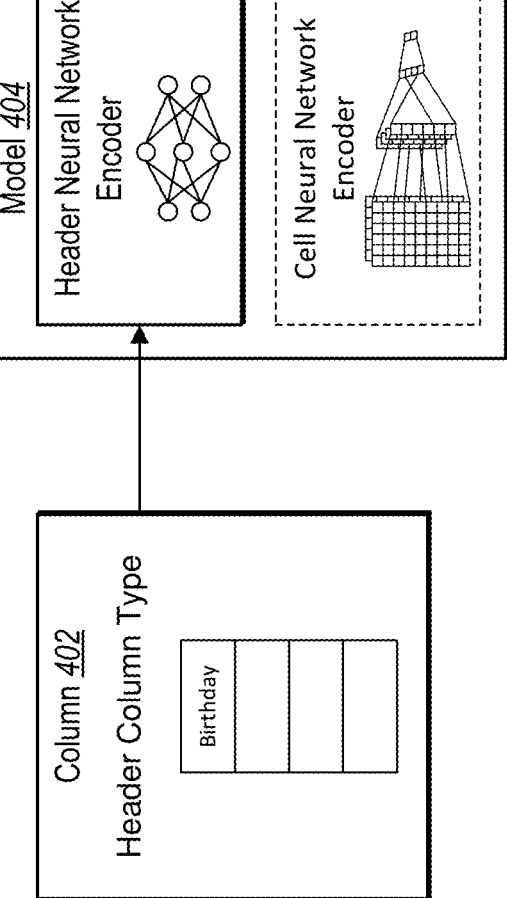
Fig. 4A

Workflows > Map CSV to XDM Schema

CSV columns mapped to XDM fields

| Input Column | XDM Field |
|---|---|
| ID | _id - 0.9105 |
| ID | Identitymap - 0.9114 |
| ID | endUserIDs._experience.aaid.id - 0.9162 |
| Firstname | Person.name.firstName - 0.7558 |
| LastName | Person.name.lastName - 0.7427 |
| | Person.birthDate - 0.6741 |

XDM Heirarchy

- XDM | object
  - identityMap | object
  - _id | string
  - timestamp | string
  - eventType | string
  - advertising | object
    - adViewability | object
      - adUnitDepth | integer
      - viewportHeight | integer
      - viewportWeight | integer
      - adHeight | integer
      - adWidth | integer
      - playerVolume | integer
      - measurementEligible | boolean
      - implementationDetails | object
        - name | string
        - version | string
      - viewable | boolean
      - activewindow | boolean Cancel    Next

- Home
- Profiles
- Segments
- Identities
- Schemas
- Datasets
- Connections
- ML Models
- Queries
- Workflows
- Monitoring

*Fig. 7C*

DYNAMICALLY DETERMINING SCHEMA LABELS USING A HYBRID NEURAL NETWORK ENCODER

BACKGROUND

Recent years have seen a rapid increase in the storage, management, distribution, and analysis of large digital data volumes. For instance, current data analytics systems often identify and import large repositories of digital information from remote data servers and then analyze these data repositories utilizing complex data analysis models such as neural networks, prediction models, or other analytical algorithms. Although conventional systems can identify, import, and analyze large, complex data volumes, conventional systems have a number of shortcomings with regard to flexibility, efficiency, and accuracy in extracting, transforming, and loading these volumes.

For instance, conventional data analytics systems are rigid in requiring specific digital formats and labels to analyze large volumes of data. In particular, conventional data analytics systems often require data from external sources to conform to a rigid labeling scheme in order to import and analyze the data sources. For example, some conventional data analytics systems utilize rule based schema matching to align information in large data volumes to a native labeling scheme utilized by one or more analytics models. Such systems, however, are rigid and often require imported digital data to comply with a particular format to match with the native labeling scheme. Moreover, labeling schemes often change and grow, and conventional systems that utilize rule based schema matching cannot flexibly adapt to map incoming data sources to modified labels. In addition, such rule-based approaches fail to generalize to unseen data samples in importing large volumes of information. Some conventional data analytics systems utilize classifiers to match data to labeling schemes; however, such systems also fail to flexibly accommodate newly added labels without retraining. Indeed, such conventional data analytics systems fail to incorporate added or modified labels without retraining the classifier.

Additionally, conventional data analytics systems are inefficient. For example, many conventional data analytics systems require handcrafted rules for rule-based matching. However, handcrafting rules require an excessive and inefficient amount of effort and resources to build and maintain schema matching rules as a collection of available schemas grows. Moreover, some conventional data analytics systems require user input via individual administrator devices and corresponding users to match data to available labels. This often requires significant, inefficient user interactions while also resulting in inconsistent mappings across administrator devices. Additionally, many conventional data analytics systems that utilize classifiers inefficiently utilize resources. For instance, training (and re-training) classifiers to accommodate modified labeling schemes requires significant processing power and storage requirements.

In addition to being rigid and inefficient, conventional data analytics systems are also inaccurate. For example, conventional data analytics systems often inaccurately align large data volumes to native labeling schemes for analytics models because rule-based systems often require the presence of complete data and/or a familiar data format to use the rule definitions. Furthermore, conventional data analytics systems that utilize rule-based matching often fail to accurately match to unseen examples (i.e., newly added labels). Moreover, as a collection of digital labels increases, conventional data analytics systems that utilize classifiers often fail to accurately identify the newly added labels. Finally, as mentioned above, some conventional data analytics systems require individual administrator devices and corresponding users to match or define rules to match uploaded data to available labeling schemes, which often results in inaccuracies and inconsistencies across administrator devices.

These and other problems exist with regard to automatically matching portions of large data repositories to an appropriate schema.

SUMMARY

The disclosure describes one or more embodiments that provide benefits and solve one or more of the foregoing or other problems in the art with systems, non-transitory computer-readable media, and methods that dynamically determine schema labels for columns of digital data repositories utilizing hybrid neural networks. In particular, utilizing a hybrid neural network approach, the disclosed systems can accurately and efficiently determine schema labels for digital columns, even in analyzing new schema labels unseen in training iterations. For example, the disclosed systems can identify a column that contains an arbitrary amount of information (e.g., a header-only column, a cell-only column, or a whole column with both header and cell information). Subsequently, the disclosed systems can determine a schema label for the column using a hybrid neural network encoder model trained using a ranking loss and historical matching records to map a column to a schema label. In particular, the disclosed systems can generate a vector embedding for an arbitrary input column by selectively using a header neural network (e.g., a sequence-based neural network) and/or a cell neural network (e.g., a convolutional neural network) based on whether the column includes a header label and/or whether the column includes populated column cells. Moreover, the disclosed systems can compare (e.g., using cosine similarities) the column vector embedding to schema vector embeddings of candidate schema labels in a low dimensional space to determine a schema label for the column. Accordingly, the disclosed systems can easily, efficiently, and accurately determine schema labels for columns of various column input types using both known schema labels and newly added schema labels.

BRIEF DESCRIPTION OF THE DRAWINGS

The detailed description is described with reference to the accompanying drawings in which:

FIG. 4A illustrates generating a column vector embedding for a column including a header column type in accordance with one or more embodiments.

FIGS. 7A-7D illustrate graphical user interfaces of a dynamic schema determination system in accordance with one or more embodiments.

DETAILED DESCRIPTION

Figure 1:
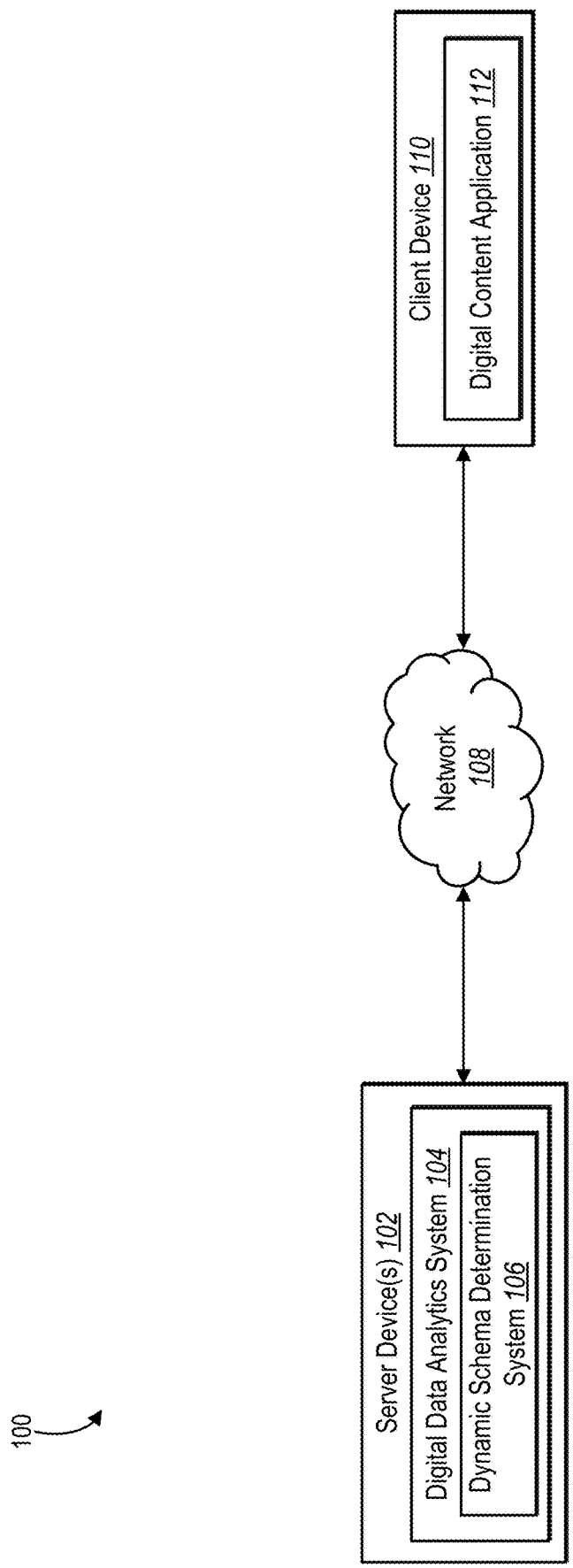
FIG. 1 illustrates a schematic diagram of an example system environment in which a dynamic schema determination system can operate in accordance with one or more embodiments.

One or more embodiments of the present disclosure include a dynamic schema determination system that utilizes hybrid neural networks to generate schema labels for arbitrary types of input columns. In particular, the dynamic schema determination system can utilize different neural networks to analyze different column input types (e.g., a header column type, a cell column type, or both). Specifically, the dynamic scheme determination system can utilize neural networks trained using a ranking loss to generate vector embeddings for columns of an input digital dataset and generate vector embeddings for schema labels. By comparing these column vector embeddings and schema vector embeddings, the dynamic scheme determination system can accurately identify schema labels that correspond to individual data columns. Moreover, by utilizing multiple neural networks trained using a ranking loss, the dynamic scheme determination system can seamlessly generate schema label embeddings for new schema labels (that were not included in training the neural networks) and accurately align digital columns with the new schema labels without retraining the neural networks. Accordingly, the dynamic scheme determination system can accurately, efficiently, and flexibly generate schema labels for columns of large repositories of digital datasets.

For example, the dynamic schema determination system can identify a column within a digital dataset. Furthermore, the dynamic schema determination system can determine a column type for the column by determining whether the column is a header column type (e.g., includes a header or other type of column label) and whether the column is a cell column type (e.g., includes one or more populated column cells). Indeed, the dynamic schema determination system can determine that the column is a header-only column, a cell-only column, or a whole column. Then, the dynamic schema determination system can select a neural network encoder model based on whether the column is a header-only column, a cell-only column, or a whole column. For instance, in some embodiments, the dynamic schema determination system can select between a header neural network encoder and a cell neural network encoder (based on the column type) to generate a column vector embedding for the column. For example, the header neural network encoder can include a sequence-based neural network. Additionally, the cell neural network encoder can include a convolutional neural network. Moreover, the dynamic schema determination system can generate schema vector embeddings for candidate schema labels using a header neural network encoder. Subsequently, the dynamic schema determination system can determine a schema label for the column by comparing the column vector embedding to schema vector embeddings (e.g., using cosine similarities).

As just mentioned, the dynamic schema determination system can identify a column within a digital dataset and determine a column input type. Specifically, the dynamic schema determination system can determine a column input type for the column based on whether the column includes a header label (i.e., a header or other label indicating the contents of the column), at least one populated column cell, or both. For instance, the dynamic schema determination system can determine the column to be a header column type if the column includes a header label, to be a cell column type if the column includes a populated column cell, and both a header column type and a cell column type if the column includes both. Thus, the dynamic schema determination system can determine whether a column is a header-only column, a cell-only column, or a whole column that includes both a header label and populated column cells.

Additionally, the dynamic schema determination system can selectively utilize different neural network encoder models on the column to generate a column vector embedding based on the column input type. For instance, in some embodiments, the dynamic schema determination system selects a header neural network encoder (e.g., a sequence-based neural network encoder) for a header-only column and generates a column vector embedding by applying the header neural network encoder to a header label from the column. Moreover, the dynamic schema determination system can select a cell neural network encoder (e.g., a convolutional neural network encoder) for a cell-only column and can generate a column vector embedding by applying the cell neural network encoder to one or more populated column cells from the column. For a whole column, the dynamic schema determination system can use both the header neural network encoder (on a header label) and the cell neural network encoder (on at least one populated column cell) and can concatenate the resulting vector embeddings to generate a column vector embedding.

Subsequently, the dynamic schema determination system can determine a schema label for the column. For instance, the dynamic schema determination system can generate schema vector embeddings by applying a sequence-based neural network encoder to candidate schema labels (or identify the schema vector embeddings). Furthermore, the dynamic schema determination system can utilize cosine similarities between the column vector embedding and the schema vector embeddings to determine similarity (or confidence) scores between the column and particular schema label pairs. Indeed, the dynamic schema determination system can utilize the similarity scores to determine a schema label for the column and use the schema label to update the column (or the dataset that includes the column). In one or more embodiments, the dynamic schema determination system also provides graphical user interfaces to display the determined schema labels and to provide access to functionalities in relation to the schema labels.

In addition to applying neural network encoder models, the dynamic schema determination system can also train neural network encoder models. Indeed, as discussed above, the dynamic schema determination system can jointly train a header neural network encoder and cell neural network encoder utilizing a ranking loss. In particular, the dynamic schema determination system can analyze training columns and training schema labels and utilize the header neural network encoder and cell neural network encoder to generate training column embeddings and training schema embeddings. The dynamic schema determination system can then utilize ground truth similarity metrics and a ranking loss to jointly train the neural networks to reduce the distance (in vector space) for similar columns and labels.

The disclosed dynamic schema determination system provides several advantages over conventional systems. For instance, the dynamic schema determination system can generate schema labels for columns from voluminous digital datasets with improved flexibility relative to conventional data analytics systems. In particular, unlike many conventional data analytics systems, by utilizing a hybrid neural network encoder model, the dynamic schema determination system can determine schema labels for columns regardless of the availability of data within cells of the column (e.g., for any column input type). In addition, as discussed above, the dynamic schema determination system can train neural network encoder models using a pair-wise ranking loss to generate vector embedding of the column and candidate schema labels in the same latent space. Thus, the dynamic schema determination system can generalize the determination process to map a column to newly added schema labels as labeling schemes morph and grow (without having to retrain or redefine matching rules).

Additionally, the dynamic schema determination system can also improve efficiency. For example, the dynamic schema determination system can automatically map schema labels to columns with arbitrary amounts of information without the time and resources utilized to build and maintain definitions for a rule-based matching system. In addition, the dynamic schema determination system can efficiently extract, transform, and load data values without requiring excessive time and resources from administrators and corresponding devices. The dynamic schema determination system can also reduce the utilization of computing resources by accurately mapping columns to newly added schemas without having to retrain or redefine matching rules.

In addition, the dynamic schema determination system can also improve efficiency through unique user interfaces that reduce time, computer resources, and interactions with client devices. For example, as outlined in greater detail below, the dynamic schema determination system can provide schema mapping user interfaces with suggested schema label elements together with digital data columns of digital datasets. Client devices can efficiently select or modify schema labels via a schema mapping user interface to reduce the time and number of user interactions required to accurately apply schema labels to columns of large data repositories.

Moreover, in addition to improvements in flexibility and efficiency, the dynamic schema determination system can also improve accuracy. In particular, relative to conventional data analytics systems, the dynamic schema determination system can maintain schema mapping consistency and accuracy between data repositories provided by different users, even though the data may have different amounts of information (e.g., a column with a header and without populated column cells and/or a column without a header and with a populated column cell). In contrast, many conventional data analytics systems cannot accurately and consistently map data to schemas when the provided data is incomplete and/or does not fit a pre-defined data model. In addition, as just mentioned, the dynamic schema determination system can also accurately map a column to newly added schema labels without having to retrain or redefine matching rules.

As illustrated by the foregoing discussion, the present disclosure utilizes a variety of terms to describe features and advantages of the dynamic schema determination system. Additional detail is now provided regarding the meaning of such terms. As used herein, the term "column" refers to a set, list, or array of digital information. In particular, a "column" can refer to a set or list of information that can include a header or other indicator of the contents of a column (e.g., a header label) and corresponding data (e.g., cell data). For instance, a column can include a set or list of information that is represented horizontally (e.g., as a row of data) or vertically with a header label that represents the type of information included in the set or list. For example, in one or more embodiments, a column includes a tabular set or list of information that can include a header label (e.g., a first cell that is presented as an identifying title or label) and additional cells that can include data entries (e.g., populated column cells).

As used herein, the term "column input type" (or sometimes referred to as "column type") refers to a classification of a characteristic of a column. In particular, the term "column input type" can refer to a classification of a column that identifies the type of information provided within or in association with the column. For example, a column input type can include a header column type and/or a cell column type. As used herein, the term "header column type" refers to a classification that indicates that a column includes a header label. For example, a header label can include a first data entry in a column that identifies the subject of the column, a title, and/or metadata associated with a column that identifies the subject of the column. Furthermore, as used herein, the term "cell column type" refers to a classification that indicates that a column includes at least one populated column cell (e.g., a populated column cell that is not the header label). For example, a populate column cell can include a data entry within a column and/or an element or value in a set or a list.

As an example, the dynamic schema determination system can identify a column as including (or being) a header column type when the column includes a header label. Furthermore, the dynamic schema determination system can identify a column as including (or being) a cell column type when the column includes a populated column cell (i.e., a column cell different than a header cell or header label). Furthermore, as an example, the dynamic schema determination system can identify a column as including (or being) both a header column type and a cell column type when the column includes both a header label and a populated column cell.

As used herein, the term "schema label" refers to a classification, descriptor, label, or identifier. For instance, a schema label can include a descriptor or label that describes a collection of digital data (e.g., a column or other data construct). In particular, the term "schema label" can refer to a classification, descriptor, or identifier that classifies content within a list or set of data (e.g., a semantically closed schema). For example, for a data column comprising a plurality of dates in different cells, the dynamic schema determination system can determine and apply a schema label of "birthdates" to the data column (e.g., as a new classifier or label for the column). In some embodiments, the dynamic schema determination system utilizes a plurality of schema labels in analyzing data, and automatically aligns imported data columns to the corresponding schema labels. A more detailed description of schema labels and corresponding examples are provided below in relation to the illustrative figures.

As used herein, the term "neural network encoder model" (sometimes referred to as "neural network" or "neural network encoder") refers to a machine learning model that can be tuned (e.g., trained) based on inputs to approximate unknown functions. In particular, the term "neural network encoder model" can refer to a model of interconnected layers that communicate and analyze attributes at varying degrees of abstraction to learn to approximate functions and generate outputs based on a plurality of inputs provided to the model. For instance, the term "neural network encoder model" includes one or more machine learning algorithms (or models). In particular, the term "neural network encoder model" includes convolutional neural networks (e.g., "CNNs"), sequence-based neural networks, dense networks, and/or fully convolutional neural networks (e.g., "FCNs"). In other words, a neural network encoder model includes an algorithm that implements deep learning techniques, i.e., machine learning that utilizes a set of algorithms to attempt to model high-level abstractions in data. For instance, a neural network encoder model can analyze attributes of a column (e.g., a header and/or populated column cell) and output a vector embedding (or latent vector) for the column in a latent space.

As used herein, the term "header neural network encoder" (sometimes referred to as "header neural network") refers to a neural network that generates a vector embedding using a header label (or schema label). For instance, a header neural network encoder can include a sequence-based neural network encoder and/or a neural network encoder that generates a summation of word embeddings. Furthermore, as used herein, the term "sequence-based neural network encoder" (sometimes referred to as "sequence-based neural network" or "sequence-based neural network encoder model") refers to a neural network that analyzes the sequence of input or the sequential order of input to generate a vector embedding (or latent vector) in a latent space. For example, a sequence-based neural network encoder can include a set of algorithms that attempts to model high-level abstractions in data by using a list of words to model a vector embedding in a latent space. For instance, a sequence-based neural network encoder can include a recurrent neural network such as a gated recurrent unit (GRU) and/or a long short-term memory (LSTM) neural network.

As used herein, the term "cell neural network encoder" (sometimes referred to as "cell neural network") refers to a neural network that generates a vector embedding using at least one populated column cell from a column. For instance, a cell neural network encoder can include a convolutional neural network encoder. As used herein, the term "convolutional neural network encoder" (sometimes referred to as "convolutional neural network" or "convolutional neural network encoder model") refers to a neural network encoder model that utilizes one or more convolution layers to generate a vector embedding (or latent vector) in a latent space. In particular, the term "convolutional neural network encoder" can refer to a neural network that utilizes one or more layers such as RELU layers, pooling layers, fully connected layers, normalization layers with backpropagation to weight parameters in order to output a vector embedding (or latent vector) in a latent space from an input column.

As used herein, the term "vector embedding" refers to a set of values (e.g., continuous values) representing characteristics and/or attributes (i.e., features) of data. In particular, the term "vector embedding" can include a set of values corresponding to latent and/or patent attributes and/or characteristics related to words, characters, and/or values as embeddings in a low dimensional space. For instance, a vector embedding can include a multi-dimensional vector representation that encodes attributes and/or features of a set of words, characters, and/or values. For example, a vector embedding can be represented as a spatial representation (e.g., a low dimensional vector) within a multi-dimensional space that characterizes attributes and/or features of a set of words, characters, and/or values. As used herein, the term "column vector embedding" refers to a vector embedding generated based on a column. Furthermore, as used herein, the term "schema vector embedding" refers to a vector embedding generated based on a schema label.

As used herein, the term "similarity score" (sometimes referred to as a "confidence score") refers to one or more values that quantify a measure of similarity between two objects. In particular, the term "similarity score" can refer to a value that quantifies a measure of similarity between a column (or column header) and a schema label using a cosine similarity between vector embeddings of the column and the schema label. For example, a similarity score can include a value between 0 and 1 that represents how similar a column is to a particular schema label (where a higher value represents a greater similarity between the column and schema label).

Turning now to the figures, FIG. 1 illustrates a schematic diagram of a system environment 100 (e.g., a "system" 100) in which a dynamic schema determination system 106 can operate in accordance with one or more embodiments. As illustrated in FIG. 1, the system 100 includes server device(s) 102, a network 108, and a client device 110. As further illustrated in FIG. 1, the one or more component of the system 100 can communicate with each other via the network 108.

As shown in FIG. 1, the server device(s) 102 can include a variety of types of computing devices, including those described with reference to FIG. 10. The server device(s) 102 can include a digital data analytics system 104 which further includes the dynamic schema determination system 106. The digital data analytics system 104 can identify, store, process, receive, utilize, manage, analyze, and/or distribute repositories of digital data. For example, the digital data analytics system 104 can process and/or analyze digital data repositories utilizing various analytical models. For example, the digital data analytics system 104 can utilize neural networks to generate and surface forecasts to client devices, to generate digital visualizations or summaries, and/or to generate and surface digital suggestions to client devices.

Moreover, the dynamic schema determination system 106 can receive large digital data volumes (e.g., datasets that include one or more columns) from client device 110 and determine schema labels for the received data. In particular, in some embodiments, the dynamic schema determination system 106 identifies columns from datasets (e.g., from user uploaded data and/or data stored by the digital data analytics system 104). Then, the dynamic schema determination system 106 can automatically determine schema labels for the columns using a hybrid neural network encoder model. In addition, the dynamic schema determination system 106 can utilize the determined schema labels to update the datasets associated with the identified columns. For example, the dynamic schema determination system 106 can standardize multiple datasets in a central data structure with similar schema mappings to more accurately and efficiently apply analytical algorithms. Moreover, the dynamic schema determination system 106 can provide the determined schema labels to a user (e.g., the client device 110) to further assist accurate schema label matching.

As further shown in FIG. 1, the system 100 can include the client device 110. The client device 110 can modify, create, receive, and/or provide data (e.g., datasets with columns). Moreover, the client device 110 can provide a dataset to the dynamic schema determination system 106 (via the server device(s) 102) in order to determine a schema mapping (e.g., using schema labels) and/or to include the dataset within a data structure (e.g., for analytics purposes). Furthermore, the client device 110 can receive determined schema labels in relation to datasets provided by the client device 110 and view/overwrite such determined schema labels within a schema mapping user interface. The client device 110, as illustrated in FIG. 1, can include a variety of types of computing devices, including those explained below with reference to FIG. 10.

Additionally, as shown in FIG. 1, the client device 110 includes a digital content application 112. For example, the digital content application 112 can provide user interfaces and/or tools corresponding to dataset schema mappings determined by the dynamic schema determination system 106. Furthermore, the digital content application 112 can provide options to provide (e.g., upload) and/or retrieve datasets and/or modify schema mappings determined by the dynamic schema determination system 106. Additionally, the digital content application 112 can also provide user interfaces for data analytics information and/or analytics tools corresponding to datasets corresponding to the dynamic schema determination system 106. Indeed, the digital content application 112 can be a software application (e.g., that implements the dynamic schema determination system 106) or a software application hosted on the server device(s) 102. For example, when hosted on the server device(s) 102, the dynamic schema determination system 106 can be accessed by the client device 110 through a web browser or an application.

Figure 2:
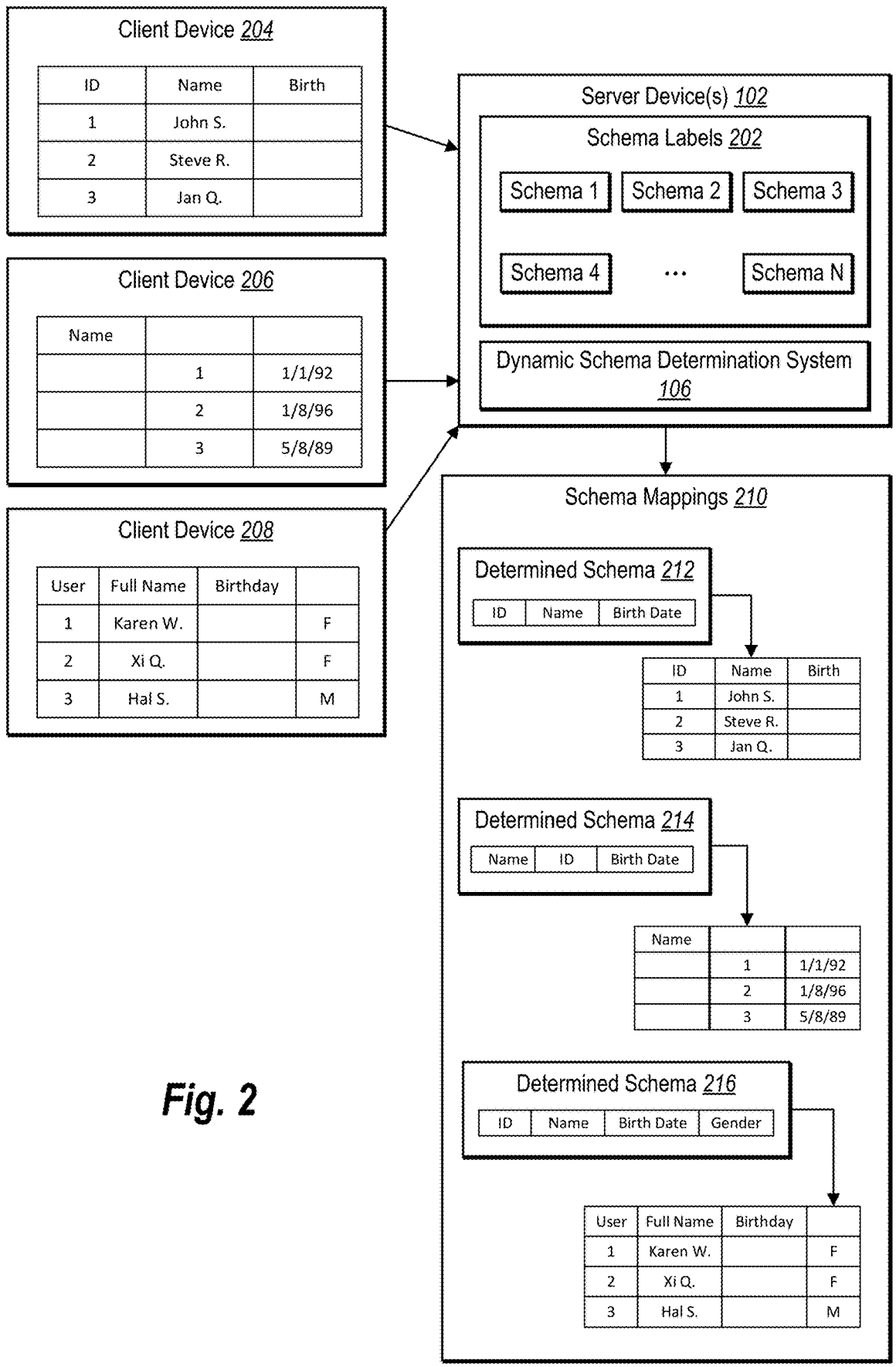
FIG. 2 illustrates a schematic diagram of a dynamic schema determination system 106 generating schema labels for datasets in accordance with one or more embodiments.

Although FIG. 1 illustrates the system 100 with the single client device 110, in one or more embodiments, the system 100 can include additional client devices. For example, the system 100 can include any number of client devices corresponding to users that create, manage, upload, utilize datasets (on the digital data analytics system 104). Furthermore, the system 100 can include multiple client devices that provide separate datasets to the dynamic schema determination system 106 for a schema mapping (as shown in FIG. 2).

Furthermore, although FIG. 1 illustrates the dynamic schema determination system 106 implemented on the server device(s) 102, the dynamic schema determination system 106 can be implemented, in whole or in part, by other computing devices and/or components in the system 100. For example, the dynamic schema determination system 106 can be implemented, in whole or in part, on the client device 110 and can determine schema labels for columns from datasets on the client device 110. Indeed, in one or more embodiments, the dynamic schema determination system 106 can be implemented on the digital content application 112.

Additionally, as shown in FIG. 1, the system 100 includes the network 108. As mentioned above, the network 108 can enable communication between components of the system 100. In one or more embodiments, the network 108 may include a suitable network and may communicate using any communications platform and technology suitable for transporting data and/or communication signals, examples of which are described with reference to FIG. 10. Furthermore, although FIG. 1 illustrates the server device(s) 102 and the client device 110 communicating via the network 108, the various components of the system 100 can communicate and/or interact via other methods (e.g., the server device(s) 102 and the client device 110 can communicate directly).

As mentioned above, the dynamic schema determination system 106 can identify (or receive) separate datasets from multiple client devices and determine schema labels for the separate datasets to standardize the datasets within an overarching data structure. In particular, multiple users may provide data for analytics and/or for data modelling. However, in many situations, the provided data may be diverse in formatting, information, header labels, and so forth. Indeed, multiple users can provide different datasets that include various combinations of different amounts of information, different orders, different number of columns, and/or different header labels. In order to reduce inconsistencies between provided data from multiple users, the dynamic schema determination system 106 determines schema labels for identified datasets (from the multiple users) such that the provided datasets can be standardized within a data structure in a way that facilitates analytics, data modelling, and/or other functionalities.

For example, FIG. 2 illustrates multiple client devices providing datasets to the dynamic schema determination system 106. As shown in FIG. 2, the datasets across client device 204, client device 206, and client device 208 contain differences in formatting, information, and header labels. For example, as illustrated in FIG. 2, the client device 204 provides a dataset that includes a column having a column header type and not a column cell type (e.g., a column with a header label of "Birthday," but without any populated column cells). Additionally, as shown in FIG. 2, the client device 206 includes two columns having column cell types but not having column header types (e.g., the second and third columns do not include a header label but do contain populated column cells). Also, as shown in FIG. 2, the datasets provided by the client device 204 and the client device 206 include different column orders. Furthermore, as illustrated in FIG. 2, the client device 208 includes an additional column without a column header type (e.g., the last column).

Moreover, as shown in FIG. 2, the users of client devices 204, 206, and 208 provide their respective datasets to server device(s) 102. Then, the dynamic schema determination system 106 can utilize schema labels 202 (e.g., Adobe XDM Schemas) and the datasets provided by the client devices 204, 206, and 208 to determine schema labels for columns and generate the schema mappings 210. Indeed, as shown in FIG. 2, the dynamic schema determination system 106 utilizes a hybrid neural network encoder model to map the dataset from the client device 204 to a determined schema 212, the dataset from the client device 206 to a determined schema 214, and the dataset from the client device 208 to a determined schema 216. As illustrated in FIG. 2, the dynamic schema determination system 106 can utilize various neural network encoder models to determine schema labels across diverse datasets (e.g., regardless of different amounts of information, different orders, different number of columns, and/or different header labels within input columns) and create a consistent data structure between the diverse datasets using determined schemas.

Figure 3A:
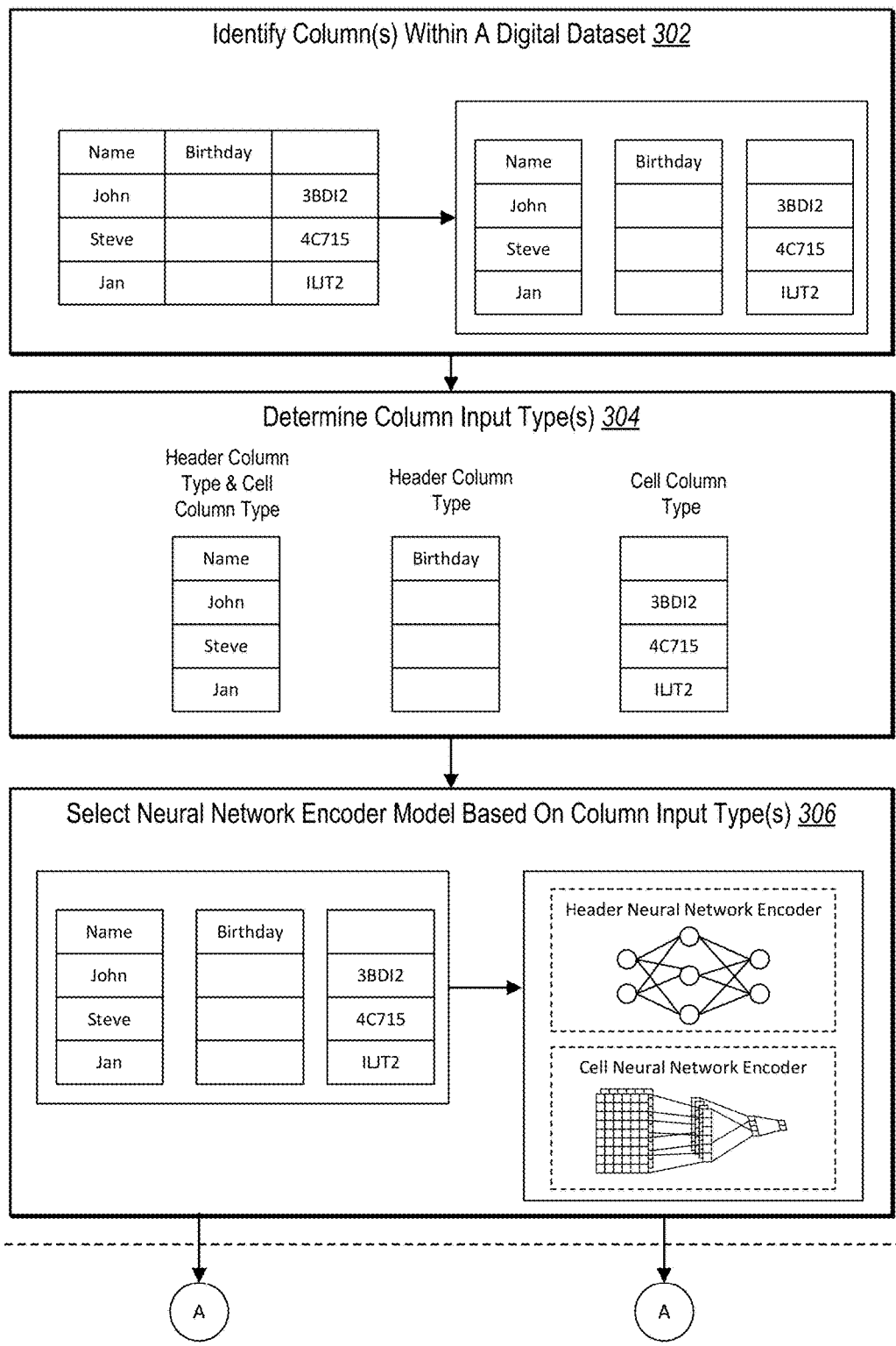
FIGS. 3A and 3B illustrate a flowchart of a dynamic schema determination system 106 generating a schema label using a hybrid neural network encoder model in accordance with one or more embodiments.
Figure 3B:
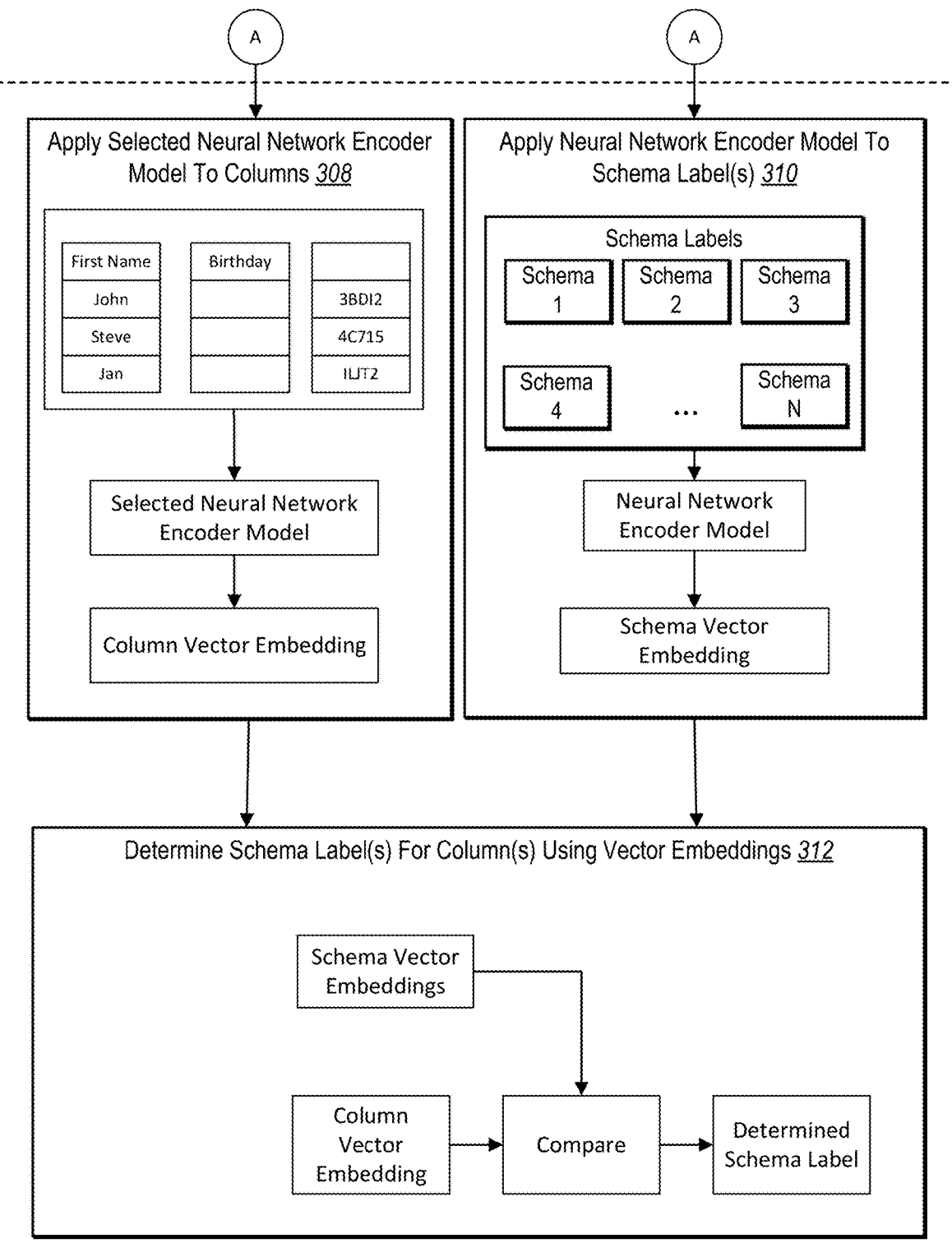

As mentioned above, the dynamic schema determination system 106 can generate schema labels for columns regardless of information availability within the columns. For instance, FIGS. 3A and 3B illustrate a flowchart of the dynamic schema determination system 106 determining a schema label for a column regardless of the column input type. Indeed, FIGS. 3A and 3B illustrates a flowchart of the dynamic schema determination system 106 identifying columns, determining column input types, selecting neural network encoder models, applying the neural network encoder models to identified columns to generate column vector embeddings, and comparing the column vector embeddings to schema vector embeddings to determine schema labels for the columns.

For example, as shown in FIG. 3A, the dynamic schema determination system 106 identifies column(s) within a digital dataset in an act 302. The dataset in the act 302 can be provided by a client device. Indeed, as illustrated in FIG. 3A, the dynamic schema determination system 106 can identify three columns within the digital dataset. Furthermore, as shown in FIG. 3A, the three columns include different amounts of information.

Although the shown in FIG. 3A only includes three columns for illustrative purposes, it will be appreciated that the dynamic schema determination system 106 can quickly and efficiently map schemas on voluminous digital datasets. Indeed, in some embodiments, the dynamic schema determination system 106 can map large data repositories that include thousands of columns of digital information.

Additionally, as shown in FIG. 3A, the dynamic schema determination system 106 determines column input types in an act 304 for the identified columns. For instance, the dynamic schema determination system 106 can identify information that is available in a column to determine a column input type. In some embodiments, the dynamic schema determination system 106 determines that a column is a header column type and/or a cell column type.

In particular, the dynamic schema determination system 106 can determine whether a column includes a header column type. Indeed, in some embodiments, the dynamic schema determination system 106 determines that a column includes a header column type when the column includes a header label. Furthermore, in some embodiments, the dynamic schema determination system 106 determines that a column includes a header column type, but not a cell column type (e.g., no populated column cells). In such cases, the dynamic schema determination system 106 can determine the column to be a header-only column. For example, as shown in the act 304, the dynamic schema determination system 106 determines that a column (e.g., the column that includes a header label of "Birthday") includes a header column type. Indeed, the dynamic schema determination system 106 can determine that the column in the act 304, that only includes the header label of "Birthday," is a header-only column.

The dynamic schema determination system 106 can further determine whether a column includes a cell column type. For instance, the dynamic schema determination system 106 can determine that a column includes a cell column type if the column includes at least one populated column cell (e.g., a non-header cell). Furthermore, in some embodiments, the dynamic schema determination system 106 determines that a column includes a cell column type, but not a header column type (e.g., no header label). As a result, the dynamic schema determination system 106 can determine the column to be a cell-only column. For instance, as shown in the act 304, the dynamic schema determination system 106 determines that a column (e.g., the column that includes cell values such as "3BDI2" and "4C715") includes a cell column type. Indeed, the dynamic schema determination system 106 can determine that the column in the act 304, that only includes the cell values (e.g., values such as "3BDI2" and "4C715"), is a cell-only column.

Additionally, the dynamic schema determination system 106 can also determine that a column includes both a header column type and a cell column type. For instance, the dynamic schema determination system 106 can determine that a column includes both a header column type and a cell column type when the column includes both a header label and at least one populated column cell. In such cases, the dynamic schema determination system 106 can determine the column to be a whole column. For example, as illustrated in the act 304, the dynamic schema determination system 106 determines that a column (e.g., the column that includes a header label of "Name" and cell values such as "John") includes both a header column type and a cell column type. In addition, the dynamic schema determination system 106 can determine that the column in the act 304, that includes the header label of "Name" and cell values such as "John," is a whole column.

Furthermore, as shown in FIG. 3A, the dynamic schema determination system 106 selects a neural network encoder model based on column input types (of the columns) in an act 306. For instance, as previously mentioned, the dynamic schema determination system 106 can select a neural network encoder model based on whether a column includes a header column type and on whether the column includes a cell column type (e.g., either or both). Indeed, as shown in FIG. 3A, the dynamic schema determination system 106 selects from a header neural network encoder and a cell neural network encoder. In one or more embodiments, the neural network encoder models (the header neural network encoder and the cell neural network encoder) are trained using ranking losses (as described in FIG. 5). Indeed, the neural network encoder models are trained to generate accurate vector embeddings for columns within a multi-dimensional space that is shared with vector embeddings for candidate schemas.

In some embodiments, the dynamic schema determination system 106 utilizes (or selects) the header neural network encoder (e.g., a sequence-based neural network encoder) to generate a column vector embedding from a column. In particular, the dynamic schema determination system 106 can select the header neural network encoder when a column includes a header column type. More specifically, the dynamic schema determination system 106 can select the header neural network encoder to generate a column vector embedding from a column when the column includes a header label. In some embodiments, the dynamic schema determination system 106 selects the header neural network encoder for a header-only column input.

Furthermore, the dynamic schema determination system 106 can utilize (or select) the cell neural network encoder (e.g., a convolutional neural network encoder) to generate a column vector embedding from a column. For instance, the dynamic schema determination system 106 can select the cell neural network encoder when a column includes a cell column type. In particular, the dynamic schema determination system 106 can select the cell neural network encoder to generate a column vector embedding from a column when the column includes at least one populated column cell. In one or more embodiments, the dynamic schema determination system 106 selects the cell neural network encoder for a cell-only column input.

In addition, the dynamic schema determination system 106 can utilize (or select) both the header neural network encoder and the cell neural network encoder to generate a column vector embedding from a column. For example, the dynamic schema determination system 106 can select both the header neural network encoder and the cell neural network encoder when a column includes a header column type and a cell column type (i.e., a whole column type). More specifically, the dynamic schema determination system 106 can select both the header neural network encoder and the cell neural network encoder to generate a column vector embedding from a column when the column includes both a header label and at least one populated column cell.

As shown in FIG. 3B, after selecting one or more neural network encoder models based on the column input type, the dynamic schema determination system 106 applies the selected neural network encoder model to the columns in an act 308. In particular, the dynamic schema determination system 106 can apply a selected neural network encoder model to a column to generate a column vector embedding. For instance, the dynamic schema determination system 106 can apply the header neural network encoder and/or the cell neural network encoder to the column to generate a column vector embedding.

For instance, in one or more embodiments, the dynamic schema determination system 106 selects and applies a header neural network to a column including a header column type. In particular, the dynamic schema determination system 106 can apply a header neural network to a header label corresponding to the column to generate a column vector embedding. For example, selecting and applying a header neural network to a column including a header column type is described in detail below (e.g., in relation to FIG. 4A).

Furthermore, the dynamic schema determination system 106 can select and apply a cell neural network to a column including a cell column type. More specifically, the dynamic schema determination system 106 can apply a cell neural network to at least one populated column cell corresponding to the column to generate a column vector embedding. For instance, selecting and applying a cell neural network to a column including a cell column type is described in detail below (e.g., in relation to FIG. 4B).

Additionally, in some embodiments, the dynamic schema determination system 106 selects and applies both a header neural network and a cell neural network to a column that includes a header column type and a cell column type. For instance, the dynamic schema determination system 106 can apply a header neural network to a header label corresponding to the column to generate a vector embedding for the header label. Additionally, the dynamic schema determination system 106 can apply a cell neural network to at least one populated column cell corresponding to the column to generate a vector embedding for the at least one populated column cell. Then, in some embodiments, the dynamic schema determination system 106 concatenates the vector embedding for the header label and the vector embedding for the at least one populated column cell to generate a column vector embedding for the column. Indeed, selecting and applying both a header neural network and a cell neural network to a column that includes a header column type and a cell column type is described in detail below (e.g., in relation to FIG. 4C).

Furthermore, as shown in FIG. 3B, the dynamic schema determination system 106 applies a neural network encoder model to schema label(s) in an act 310. For example, the dynamic schema determination system 106 can identify candidate schema labels within the digital data analytics system 104. In particular, the dynamic schema determination system 106 can utilize schema labels that are available to the digital data analytics system 104 (e.g., Adobe XDM schemas). In some embodiments, the digital data analytics system 104 (or the dynamic schema determination system 106) receives additional schema labels that are created and/or provided by users.

Indeed, the candidate schema labels can include schema labels that were utilized to train the neural network encoder models. Additionally, the candidate schema labels can also include newly added schema labels that were not utilized to train the neural network encoder models. For example, the dynamic schema determination system 106 can identify a new schema label or schema (e.g., a set of schema labels) for the digital data analytics system 104. As mentioned above, the new schema label can be created within the digital data analytics system 104 (e.g., by a user) and/or provided by a third party (e.g., a schema created and exported into the digital data analytics system 104). Indeed, the new schema label can be identified (or received) after training the neural network encoder models in accordance with one or more embodiments.

In some embodiments, the dynamic schema determination system 106 applies a neural network encoder model to the identified schema labels to generate schema vector embeddings. Indeed, the dynamic schema determination system 106 can generate the schema vector embeddings by applying a header neural network encoder (e.g., a sequence-based neural network) on the identified schema labels. For instance, the dynamic schema determination system 106 can create a list of word(s) from a schema label and encode the schema label (e.g., generate a schema vector embedding) using a header neural network encoder. In particular, the dynamic schema determination system 106 can generate schema vector embeddings in the same multi-dimensional space as the column vector embedding. In one or more embodiments, the dynamic schema determination system 106 generates schema vector embeddings from identified schema labels using a header neural network encoder as described for header labels below (e.g., in relation to FIG. 4A).

Furthermore, in some embodiments, the dynamic schema determination system 106 can identify schema vector embeddings from storage. In particular, the dynamic schema determination system 106 can store generated schema vector embeddings (from candidate schema labels) and access them to determine a schema label for a column. By doing so, the dynamic schema determination system 106 can efficiently reuse schema vector embeddings to determine a schema label for a column without having to generate the schema vector embeddings multiple times.

As illustrated in FIG. 3B, the dynamic schema determination system 106 determines schema labels for the columns using the vector embeddings in an act 312. In particular, the dynamic schema determination system 106 can determine a schema label for a column by comparing a column vector embedding corresponding to the column (from the act 308) to the schema vector embeddings corresponding to the candidate schema labels (from the act 310). For instance, the dynamic schema determination system 106 can compare the column vector embedding and the schema vector embeddings within a multi-dimensional latent space (e.g., where the vector embeddings are encoded).

More specifically, the dynamic schema determination system 106 can determine similarity (or confidence) scores between the column vector embedding and the individual schema vector embeddings by determining cosine similarities between the vector embeddings. Subsequently, the dynamic schema determination system 106 can determine a schema label for a column by ranking the similarity scores (for the column and schema label pairs). Indeed, the dynamic schema determination system 106 determining a schema label by comparing a column vector embedding to schema vector embeddings is described below (e.g., in relation to FIGS. 6A and 6B).

As mentioned above, the dynamic schema determination system 106 can apply a header neural network encoder to generate a column vector embedding for a column that includes a header column type. For instance, as shown in FIG. 4A, the dynamic schema determination system 106 identifies a column 402 that includes a header column type (e.g., a header-only column). Then, as illustrated in FIG. 4A, the dynamic schema determination system 106 selects a neural network encoder model in an act 404 based on the column 402 that includes a header column type. In particular, as illustrated in FIG. 4A, the dynamic schema determination system 106 selects a header neural network encoder in the act 404 for the column 402.

Moreover, as shown in FIG. 4A, the dynamic schema determination system 106 generates a column vector embedding in an act 406 for the column 402. As illustrated in FIG. 4A, the dynamic schema determination system 106 applies the header neural network encoder to a header label of the column 402 (e.g., the header label "Birthday"). Indeed, as shown in FIG. 4A, the dynamic schema determination system 106 generates a column vector embedding for the column 402 by utilizing the header neural network encoder on the header label of the column 402.

For example, the dynamic schema determination system 106 can utilize an encoder (i.e., a neural network encoder model) to convert a column into a latent vector (i.e., a vector embedding) in a low-dimensional space (i.e., a d-dimensional latent space). In some embodiments, the dynamic schema determination system 106 can represent a neural network encoder model as $G_{ce}$. Then, the dynamic schema determination system 106 can convert a column into a low-dimensional space $\mathbb{R}^d$ (i.e., $G_{ce}: C \to \mathbb{R}^d$). Indeed, in one or more embodiments, the dynamic schema determination system 106 can represent a universal column set as C. Moreover, the dynamic schema determination system 106 can represent a column $c \in C$ as a tuple of a header label $h_c$ and populated column cells (e.g., cells of content) $x_c$ (i.e., $c = (h_c, x_c)$).

In particular, for a column including a header column type (e.g., a header-only column), the dynamic schema determination system 106 can utilize a header neural network encoder to generate the column vector embedding. For instance, the dynamic schema determination system 106 can tokenize a header label (as a string type) corresponding to a column into a list of words. Indeed, the dynamic schema determination system 106 can map each word (from the header label) to a pretrained word embedding in a d-dimensional latent space. For example, the dynamic schema determination system 106 can represent a header label as $h = \{w_1, \ldots, w_{|h|}\}$, where $w_i \in v$ is a word in a vocabulary v. Moreover, the dynamic schema determination system 106 can represent $w \in \mathbb{R}^d$ as the embedding of word $w$.

In some embodiments, the dynamic schema determination system 106 generates a column vector embedding ($G_{ce}(c)$) using the embedding of words (w) (e.g., by using the header neural network encoder). As an example, the dynamic schema determination system 106 can generate word embeddings using a neural network (e.g., a header neural network) based on approaches such as Word2Vec, GloVe, FastText, ELMO, BERT, and/or XLNet. In particular, the dynamic schema determination system 106 can utilize a summation of word embeddings w (as word vector embeddings in a d-dimensional latent space) to generate the column vector embedding ($G_{ce}(c)$). For example, the dynamic schema determination system 106 can generate a column vector embedding ($G_{ce}(c)$) using the header label (h) by using the following function: $G_{ce}(c) = g_{sum}(h_c) = \sum_{i=1}^{|h_c|} w_i$.

Additionally, in one or more embodiments, the dynamic schema determination system 106 utilizes a sequence-based neural network encoder (as the header neural network encoder) by encoding a sequential order of the words of a header label (h) using a gated recurrent unit (GRU). In particular, the dynamic schema determination system 106 can generate a column vector embedding ($G_{ce}(c)$) using the header label (h) by using the following function:

$$G_{ce}(c) = g_{gru}(h_c) = GRU(\{w_1, \ldots, w_{|h_c|}\})$$

For instance, in one or more embodiments, the dynamic schema determination system 106 generates the column vector embedding ($G_{ce}(c)$) by utilizing the last output of the GRU cell on $w_{|h_c|}$ (of the header label).

Additionally, in one or more embodiments, the dynamic schema determination system 106 generates schema vector embeddings from candidate schema labels using a header neural network encoder. In particular, the dynamic schema determination system 106 can utilize a schema label to generate a schema vector embedding. For example, the dynamic schema determination system 106 can generate a schema vector embedding using a schema label in accordance with one or more embodiments above for generating a column vector embedding from a header label.

Figure 4B:
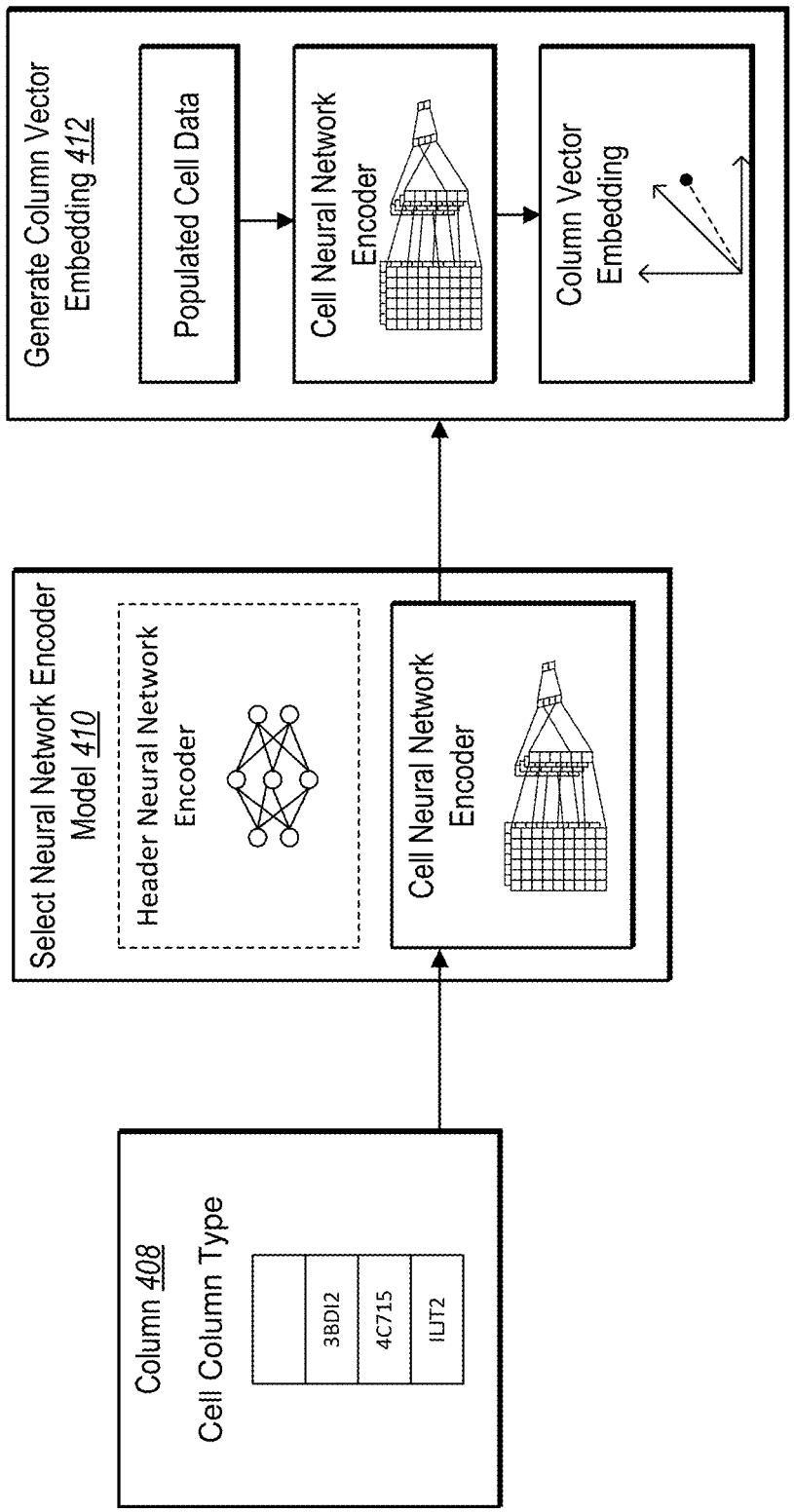
FIG. 4B illustrates generating a column vector embedding for a column including a cell column type in accordance with one or more embodiments.

As previously mentioned, the dynamic schema determination system 106 can apply a cell neural network encoder to generate a column vector embedding for a column that includes a cell column type. For example, as shown in FIG. 4B, the dynamic schema determination system 106 can identify a column 408 that includes a cell column type (e.g., a cell-only column). Subsequently, as shown in FIG. 4B, the dynamic schema determination system 106 selects a neural network encoder model in an act 410 based on the column 408 that includes a cell column type. In particular, as illustrated in FIG. 4B, the dynamic schema determination system 106 selects a cell neural network encoder (e.g., a convolutional neural network encoder) in the act 410 for the column 408.

Additionally, as illustrated in FIG. 4B, the dynamic schema determination system 106 generates a column vector embedding in an act 412 for the column 408. As shown in FIG. 4B, the dynamic schema determination system 106 applies the cell neural network encoder to the populated column cell data of the column 408. Indeed, as shown in FIG. 4B, the dynamic schema determination system 106 generates a column vector embedding for the column 408 by utilizing the cell neural network encoder on the populated column cell data of the column 408.

For instance, for a column including a cell column type (e.g., a cell-only column), the dynamic schema determination system 106 can utilize a convolutional neural network encoder (as the cell neural network encoder) to generate the column vector embedding. The populated column cells ($x_c$) can be a list of values of any data type. Furthermore, the dynamic schema determination system 106 can randomly sample m cells out of all of the cells (e.g., the populated column cells) corresponding to a column. In some embodiments, the dynamic schema determination system 106 can utilize all of the cells (e.g., as the sample m cells). Indeed, the dynamic schema determination system 106 can further concatenate them cells (e.g., the string values of the cells) into a value (e.g., a string value). In some embodiments, the dynamic schema determination system 106 truncates the string value (e.g., discards end characters) to be within a fixed string length (e.g., a threshold string length set by the dynamic schema determination system 106). Then, the dynamic schema determination system 106 can utilize a convolutional neural network encoder (e.g., a character-level convolutional neural network) to encode the string value (e.g., generate a column vector embedding).

For example, the dynamic schema determination system 106 can represent the string value of the cells m of the column c as a sequence of characters $\{z_1, \ldots, z_{|x_c|}\}$. Moreover, the dynamic schema determination system 106 can embed each character $z_i$ into a d-dimensional latent space. Additionally, the dynamic schema determination system 106 can stack all $|x_c|$ number of character embeddings to obtain a matrix denoted by $x_c \in \mathbb{R}^{|x_c| \times d}$ (e.g., within the d-dimensional latent space). Furthermore, the dynamic schema determination system 106 can utilize a convolutional neural network to generate a column vector embedding ($G_{ce}(c)$) using the at least one populated column cell (represented as string value $x_c$) by using the following function:

$$G_{ce}(c) = g_{cnn}(x_c) = W_c \cdot \text{maxpool}(\sigma(\text{conv}_2(\sigma(\text{conv}_1(x_c)))))$$

For instance, the dynamic schema determination system 106 can represent (and utilize) $\text{conv}_1$ and $\text{conv}_2$ as 1-dimensional convolutional layers, σ as an activation function ReLU, maxpool as a 1-dimensional max pooling layer, and $W_c$ as a parameter matrix (e.g., to control a dimensional size and maintain the same dimensional size as the schema vector embeddings).

Figure 4C:
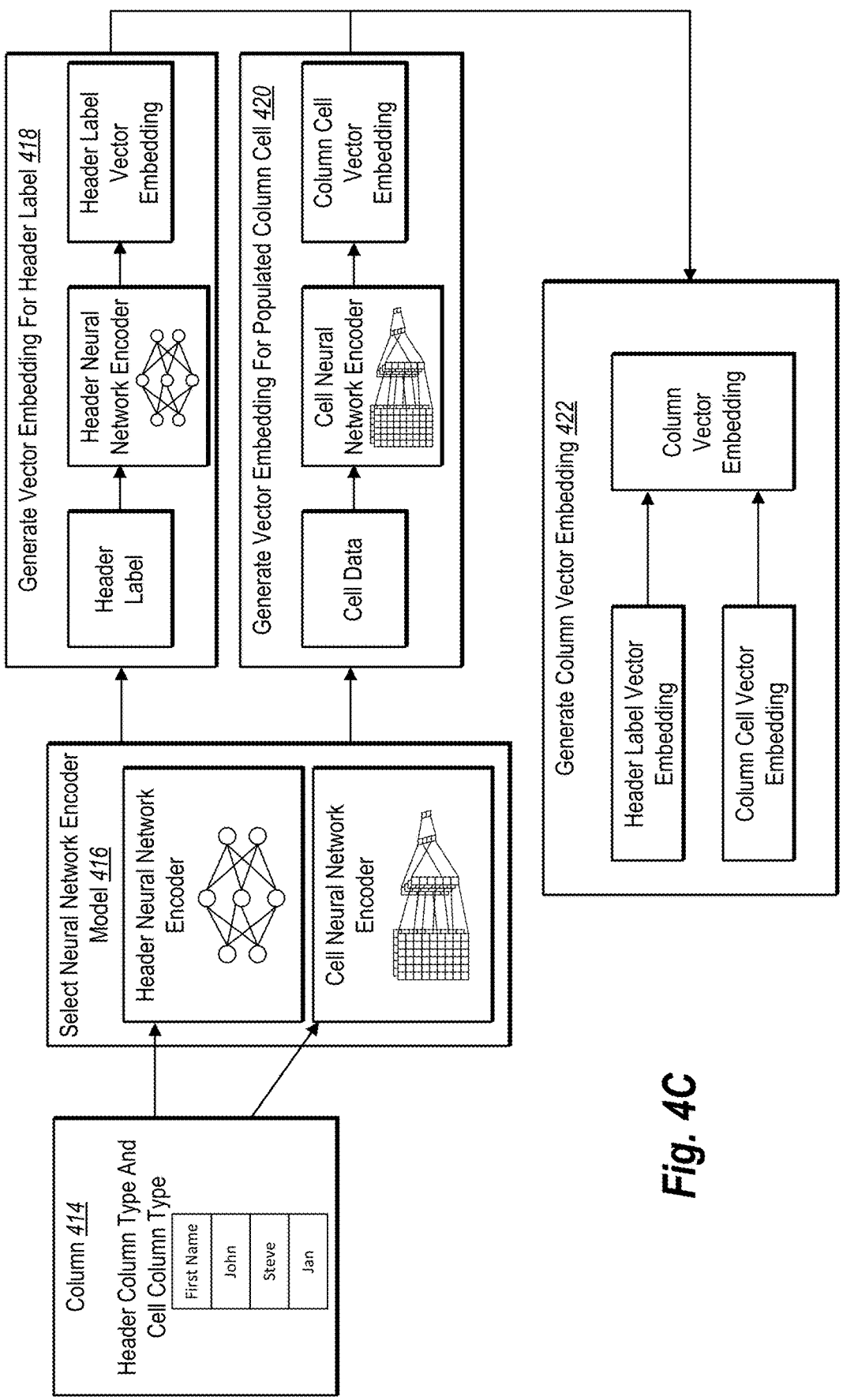
FIG. 4C illustrates generating a column vector embedding for a column including both a header column type and a cell column type in accordance with one or more embodiments.

As mentioned above, the dynamic schema determination system 106 can apply both a header neural network encoder and a cell neural network encoder to generate a column vector embedding for a column that includes both a header column type and a cell column type. FIG. 4C illustrates the dynamic schema determination system 106 identifying a column 414 that includes a header column type and a cell column type (e.g., a whole column). Subsequently, as shown in FIG. 4C, the dynamic schema determination system 106 selects a neural network encoder model in an act 416 based on the column 414 that includes a header column type and a cell column type. More specifically, as shown in FIG. 4C, the dynamic schema determination system 106 selects both a header neural network encoder and a cell neural network encoder in the act 416 for the column 414.

Then, as shown in FIG. 4C, the dynamic schema determination system 106 generates a vector embedding for a header label (from the column 414) in an act 418 and generates a vector embedding for a populated column cell (from the column 414) in an act 420. Furthermore, as shown in FIG. 4C, the dynamic schema determination system 106 utilizes the header label vector embedding and the column cell vector embedding to generate a column vector embedding in an act 422. Indeed, in reference to FIG. 4C, the dynamic schema determination system 106 utilizes the column vector embedding generated in the act 422 as the column vector embedding for the column 414.

As shown in FIG. 4C, the dynamic schema determination system 106 generates the vector embedding for the header label in the act 418. As illustrated in FIG. 4C, the dynamic schema determination system 106 applies the header neural network encoder (e.g., sequence-based neural network encoder) to the header label of the column 414. In particular, as shown in FIG. 4C, the dynamic schema determination system 106 generates the vector embedding for the header label of the column 414 by utilizing the header neural network encoder on the header label of the column 414 (e.g., described above as $g_{sum}(h_c)$ or $g_{gru}(h_c)$ in relation to FIG. 4A).

Furthermore, as shown in FIG. 4C, the dynamic schema determination system 106 generates the vector embedding for the populated column cell in the act 420. For instance, as shown in FIG. 4C, the dynamic schema determination system 106 applies the cell neural network encoder (e.g., convolutional neural network encoder) to cell data (e.g., at least one populated column cell) of the column 414. More specifically, as shown in FIG. 4C, the dynamic schema determination system 106 generates the vector embedding for the populated column cell of the column 414 by utilizing the cell neural network encoder on the cell data of the column 414 (e.g., described above as $g_{cnn}(x_c)$ in relation to FIG. 4B).

Then, as shown in FIG. 4C, the dynamic schema determination system 106 generates a column vector embedding in the act 422 by using the header label vector embedding (from the act 418) and the column cell vector embedding (from the act 420). In some embodiments, the dynamic schema determination system 106 can generate the column vector embedding in the act 422 by concatenating the header label vector embedding (from the act 418) and the column cell vector embedding (from the act 420). Specifically, the dynamic schema determination system 106 can concatenate the header label vector embedding (i.e., $g_{sum}(h_c)$ or $g_{gru}(h_c)$) and the column cell vector embedding (i.e., $g_{cnn}(x_c)$). For example, the dynamic schema determination system 106 can generate the column vector embedding $G_{ce}(c)$) for the column 414 by using the following function:

$$G_{ce}(c) = W \cdot [g_{gru}(h_c); g_{cnn}(x_c)] \text{ or } G_{ce}(c) = W \cdot [g_{sum}(h_c); g_{cnn}(x_c)]$$

where [;] denotes a concatenation and W represents a parameter matrix (e.g., to control a dimension size).

As previously mentioned, the dynamic schema determination system 106 can train the neural network encoder models based on historical matching records (e.g., ground truth schema-column pairs) to map a column to a schema label. Indeed, in some embodiments, the dynamic schema determination system 106 utilizes a ranking loss (e.g., a pair-wise ranking loss) between determined schema-column pairs to train the neural network encoder models to map columns to schema labels. For example, in some embodiments, the dynamic schema determination system 106 trains the neural network encoder models to map columns to schema labels by minimizing a ranking loss between incorrect schema-column pairs and correct schema-column pairs (from ground truth schema-column pairs). In one or more embodiments, the dynamic schema determination system 106 minimizes a ranking loss to ensure that correctly determined schema-column pairs are closer together in a multi-dimensional space (based on their vector embeddings) and that incorrect schema-column pairs are further apart in the multi-dimensional space (based on their vector embeddings).

Figure 5:
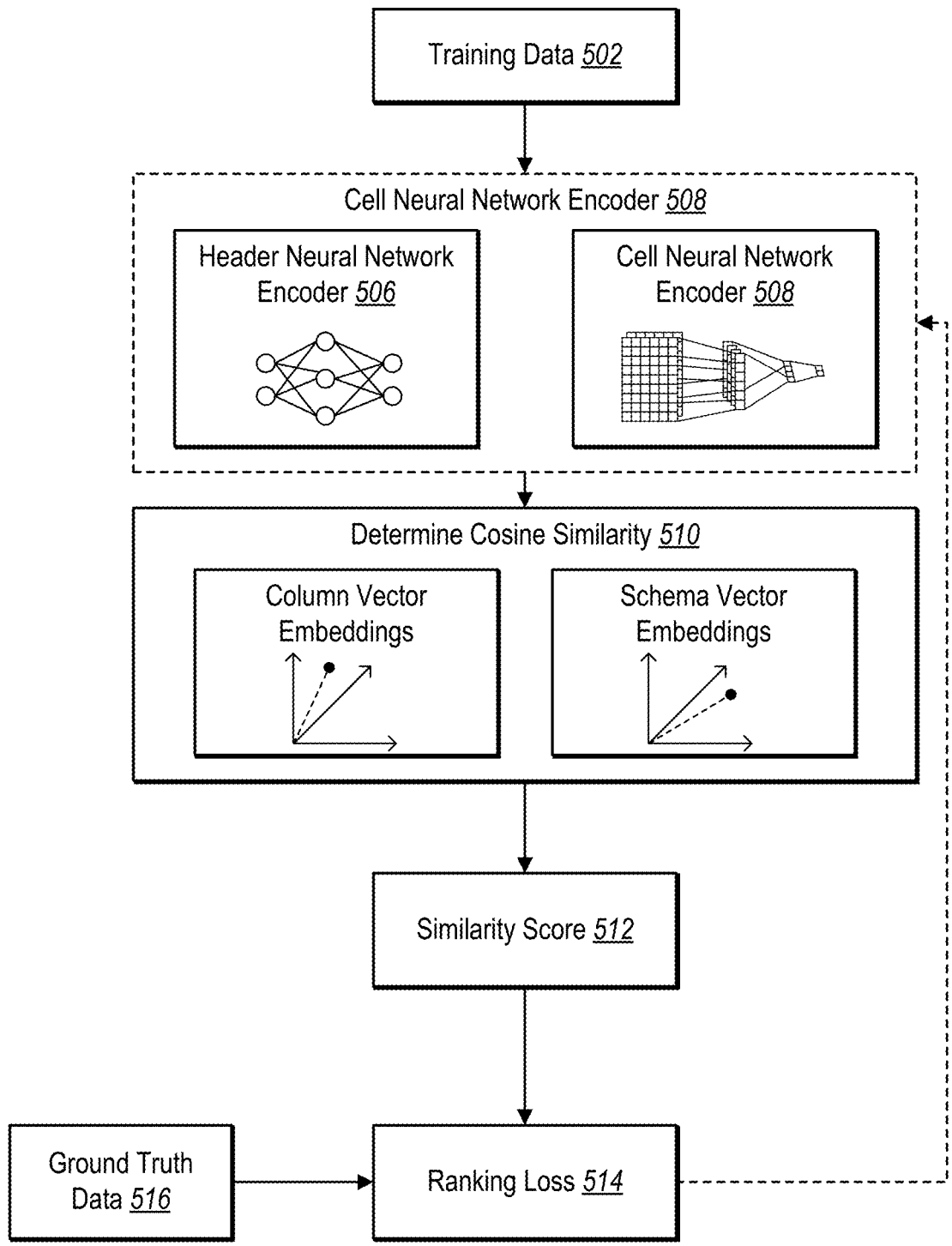
FIG. 5 illustrates training neural network encoder models using a ranking loss in accordance with one or more embodiments.

FIG. 5 illustrates the dynamic schema determination system 106 training neural network encoder models to determine schema labels for columns. As shown in FIG. 5, the dynamic schema determination system 106 utilizes training data 502 and ground truth data 516 (e.g., from correctly labeled schema-column pairs) to train neural network encoder models 504 (which include a header neural network encoder 506 and a cell neural network encoder 508). In particular, as shown in FIG. 5, the dynamic schema determination system 106 provides the training data 502 (e.g., training columns and candidate schema labels) to the neural network encoder models 504 to generate column vector embeddings and schema vector embeddings (in accordance with one or more embodiments). Then, the dynamic schema determination system 106 can determine cosine similarities in an act 510 between the generated column vector embeddings and schema vector embeddings using the training data 502 in a multi-dimensional latent space.

Using the cosine similarities (from the act 510), the dynamic schema determination system 106 determines similarity scores 512 as shown in FIG. 5. Moreover, as illustrated in FIG. 5, the dynamic schema determination system 106 utilizes the ground truth data 516 with the similarity scores 512 to calculate a ranking loss 514. The ranking loss 514 can describe the accuracy of the neural network encoder models 504 by comparing the similarity scores corresponding to correctly determined schema-column pairs (e.g., from the column vector embeddings and schema vector embeddings) and the similarity scores corresponding to incorrectly determined schema-column pairs. Then, the dynamic schema determination system 106 provides the ranking loss 514 to the neural network encoder models 504 to iteratively optimize parameters of the neural network encoder models 504 and generate updated similarity scores between schema-column pairs determined from the training data 502. Indeed, as mentioned above, the dynamic schema determination system 106 can iteratively determine a ranking loss with updated parameters for the neural network encoder models 504 to minimize the ranking loss 514 (e.g., to train the neural network encoder models 504 to map columns to schema labels).

In one or more embodiments, the dynamic schema determination system 106 utilizes historical records (e.g., existing columns from datasets) as training data and ground truth data. For example, the dynamic schema determination system 106 can use existing columns (as training data) from the digital data analytics system 104 (e.g., existing datasets from the Adobe Experience Platform) that include schema labels (e.g., XDM schema labels). Indeed, the dynamic schema determination system 106 can utilize the existing columns with their schema labels as training data and ground truth data. In particular, in relation to FIG. 5, the dynamic schema determination system 106 utilizes the existing columns as the training data 502 (in addition to candidate schema labels available to the digital data analytics system 104). Moreover, in relation to FIG. 5, the dynamic schema determination system 106 utilizes the existing schema labels for the existing columns as the ground truth data 516.

As mentioned above, the dynamic schema determination system 106 trains the neural network encoder models to map columns to schema labels by minimizing a ranking loss between incorrect schema-column pairs and correct schema-column pairs (from ground truth schema-column pairs). For example, the dynamic schema determination system 106 can represent each schema label $y \in \mathcal{Y}$ as a string of words. In one or more embodiments, the dynamic schema determination system 106 determines a similarity score for a schema-column pair from training data using a cosine similarity ($g_{score}(c,y) = \cos(G_{ce}(c), G_{ce}(y))$) between a training column vector embedding ($G_{ce}(c)$) and a schema vector embedding ($G_{ce}(y)$) (as described in FIGS. 6A and 6B). Then, the dynamic schema determination system 106 utilizes the similarity scores to determine a ranking loss.

For instance, the dynamic schema determination system 106 can determine a ranking loss using a summation over all correctly paired training columns and schema labels based on ground truth data. In particular, the dynamic schema determination system 106 can determine a ranking loss ($\ell_{rank}$) between training columns (c) and schema labels (y) using the following function:

$$\ell_{rank} = \sum_{(c,y^+) \in \mathcal{D}_{train}} \mathbb{E}_{y^-} - [\sigma(g_{score}(c, y^-) - g_{score}(c, y^+))]$$

For instance, the dynamic schema determination system 106 can represent correctly determined schema-column pairs (based on ground truth data) as the positive pairs ((c,y$^+$)) and can represent the incorrectly determined schema-column pairs as the negative pairs ((c,y$^-$)). Furthermore, the dynamic schema determination system 106 can determine an expected value ($\mathbb{E}_{y^-}$) (e.g., as an average) of a randomly selected subset ($\sigma$) of incorrectly determined schema-column pairs over the correctly determined schema-column pairs ((c,y$^+$)). Then, the dynamic schema determination system 106 can learn the function $f: C \rightarrow \mathcal{Y}$ such that it maps any column $c \in C$ to any schema $y \in \mathcal{Y}$ given a training set $\mathcal{D}_{train} = (C_{train}, \mathcal{Y}_{train}) \subset C \times \mathcal{Y}$.

In one or more embodiments, the dynamic schema determination system 106 utilizes a randomly selected subset ($\sigma$) of incorrectly determined schema-column pairs to determine a ranking loss. In particular, the dynamic schema determination system 106 can utilize a randomly selected subset of incorrectly determined schema-column pairs from all available incorrectly determined schema-column pairs to limit the number of calculations performed. Furthermore, by using a randomly selected subset of incorrectly determined schema-column pairs, the dynamic schema determination system 106 can avoid skewing the determined ranking loss (e.g., due to a high number of incorrect schema-column pairs).

Indeed, in reference to FIG. 5, the dynamic schema determination system 106 can determine the ranking loss ($\ell_{rank}$) and utilize the ranking loss ($\ell_{rank}$) (e.g., as part of a back-propagation) to optimize parameters of the neural network encoder models 504 in order to iteratively minimize the ranking loss ($\ell_{rank}$). Furthermore, the dynamic schema determination system 106 can utilize the neural network encoder models 504 as trained neural network encoder models after achieving a desired ranking loss (e.g., a threshold ranking loss). By doing so, the dynamic schema determination system 106 trains to the neural network encoder models 504 to place correct schema-column pairs closer together in a multi-dimensional space (based on their vector embeddings) and incorrect schema-column pairs further apart in the multi-dimensional space (based on their vector embeddings).

Figure 6A:
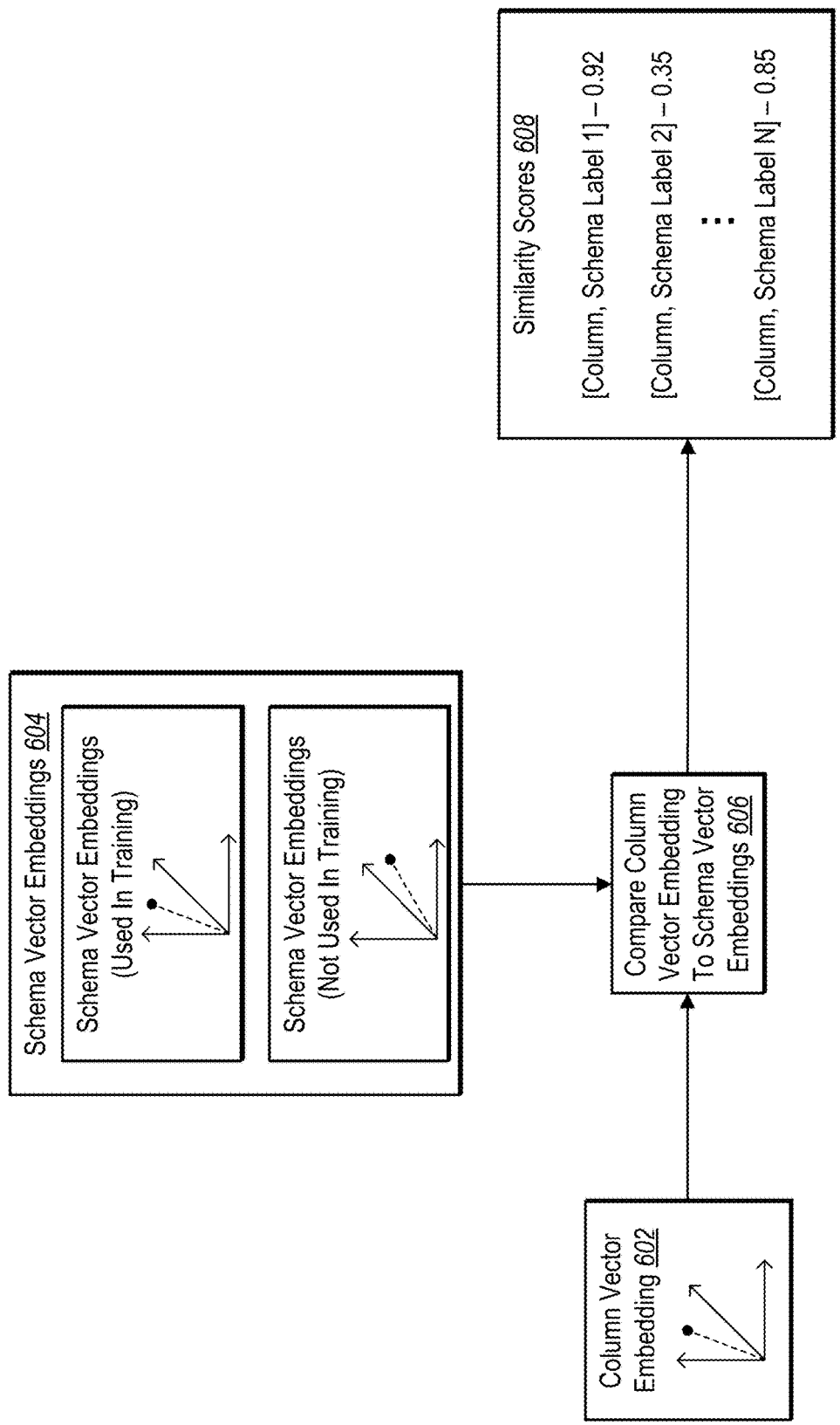
FIG. 6A illustrates determining similarity scores for schema-column pairs in accordance with one or more embodiments.

As mentioned above, the dynamic schema determination system 106 can compare a column vector embedding to schema vector embeddings to determine similarity scores between columns and candidate schema labels. For example, FIG. 6A illustrates the dynamic schema determination system 106 determining similarity scores between columns and candidate schema labels. In particular, as shown in FIG. 6A, the dynamic schema determination system 106 compares a column vector embedding 602 to schema vector embeddings 604 (e.g., both generated in accordance with one or more embodiments herein) in an act 606 to generate similarity scores 608. As illustrated in FIG. 6A, the dynamic schema determination system 106 utilizes schema vector embeddings 604 from schema labels that were used in training and also from schema labels that were not used in training (e.g., newly added schema labels). Furthermore, as shown in FIG. 6A, the dynamic schema determination system 106 generates similarity scores 608 between schema-column pairs (using cosine distances based on comparisons between the column vector embedding and the schema vector embeddings in the act 606).

As just mentioned, the dynamic schema determination system 106 utilizes schema vector embeddings from schema labels that were used in training and also from schema labels that were not used in training (e.g., newly added schema labels). In particular, the dynamic schema determination system 106 can identify or receive a new schema label. Then, the dynamic schema determination system 106 can utilize a trained neural network encoder model (e.g., a trained header neural network model) to generate a schema vector embedding for the new schema label in the same multi-dimensional vector space as the schema vector embeddings for the schema labels used in training. For instance, during training, the dynamic schema determination system 106 does not make the assumption that all kinds of schema labels in $\mathcal{Y}$ are seen in the training set $\mathcal{Y}_{train}$, or equivalently, $\{y | y \in \mathcal{Y}, y \notin \mathcal{Y}_{train}\} \neq \emptyset$. Indeed, in one or more embodiments, the dynamic schema determination system 106 expects function $f: C \rightarrow \mathcal{Y}$ to generalize on new schemas that do not appear in the training set. By doing so, the dynamic schema determination system 106 can continue to determine schema labels for a column from a collection of candidate schema labels that receives new schema labels without having to retrain the neural network encoder model.

Furthermore, the dynamic schema determination system 106 can determine similarity scores for schema-column pairs. More specifically, the dynamic schema determination system 106 compares a column vector embedding to a schema vector embedding (of a schema label) in a multi-dimensional space to determine a similarity score for the schema-column pair. For instance, the similarity score can represent a confidence of and/or measure of how similar the column and the schema label are in the multi-dimensional space. The similarity score can be represented numerically or using any other quantifiable value. In some embodiments, the dynamic schema determination system 106 determines a cosine similarity between the column vector embedding and the schema vector embedding (of the schema label) in a multi-dimensional space and uses the cosine similarity value as the similarity score.

For example, for a column vector embedding ($G_{ce}(c)$) and a schema vector embedding ($G_{ce}(y)$) of a schema label y, the dynamic schema determination system 106 can determine a similarity score for the schema-column pair using the following function:

$$g_{score}(c,y) = \cos(G_{ce}(c), G_{ce}(y))$$

Indeed, the dynamic schema determination system 106 can define the schema-column pair scorer ($g_{score}(c,y)$) as a value of $\mathbb{R}^d \times \mathbb{R}^d \rightarrow [-1,1]$ over a cosine similarity based on the column vector embedding ($G_{ce}(c)$) and the schema vector embedding ($G_{ce}(y)$). Indeed, in one or more embodiments, the determines that a column c is more likely to match the schema y as the similarity score (from $g_{score}(c,y)$) is closer to positive 1.

Figure 6B:
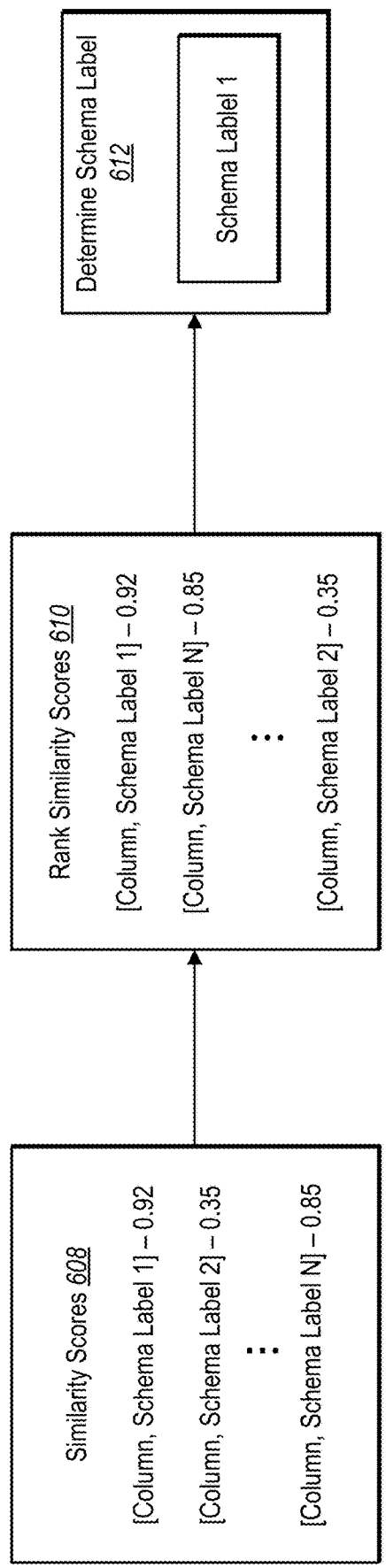
FIG. 6B illustrates determining a schema label for a column using similarity scores in accordance with one or more embodiments.

As previously mentioned, the dynamic schema determination system 106 can determine a schema label for an identified column. In particular, the dynamic schema determination system 106 can determine a schema label for an identified column using similarity scores (of schema-column pairs) from vector embedding comparisons. For example, FIG. 6B illustrates the dynamic schema determination system 106 determining a schema label for a column. As shown in FIG. 6B, the dynamic schema determination system 106 utilizes the similarity scores 608 (e.g., determined according one or more embodiments of FIG. 6A) to determine a schema label in an act 612 for a column. In particular, as illustrated in FIG. 6B, the dynamic schema determination system 106 ranks the similarity scores 608 in an act 610 (e.g., from highest to lowest scores). Then, as shown in FIG. 6B, the dynamic schema determination system 106 selects the schema label from the schema-column pair with the highest score (e.g., "[Column, Schema Label 1]") as the determined schema label for the input column (e.g., based on the column vector embedding 602) in the act 612.

Indeed, as just mentioned in reference to FIG. 6B, the dynamic schema determination system 106 can utilize a schema label from a schema-column pair that corresponds to the highest (or lowest) similarity score as the determined schema label. In some embodiments, the dynamic schema determination system 106 can select multiple schema labels for a column using similarity scores from schema-column pairs (e.g., to display the multiple schema labels as options for a column in a user interface). For example, the dynamic schema determination system 106 can select multiple schema labels for a column by selecting schema labels from the top k schema-column pairs based on the top k similarity scores.

As an example, the dynamic schema determination system 106 can identify a new column $c' \in C$ and encode the column c' using $G_{ce}$ (e.g., either and/or both of a header neural network encoder or a cell neural network encoder) into a d-dimensional vector embedding (i.e., a d-dimensional vector) and denote the vector embedding as $G_{ce}(c')$. Moreover, the dynamic schema determination system 106 can also encode (i.e., vectorize), using $G_{ce}$, all candidate schema labels $\{y_1, \ldots, y_n\} \subseteq \mathcal{Y}$ in the same d-dimensional latent space and denote the schema vector embeddings as $\{G_{ce}(y_1), \ldots, G_{ce}(y_n)\}$. Then, the dynamic schema determination system 106 can determine similarity (or confidence) scores ($s_i$) as $s_i = g_{score}(G_{ce}(c'), G_{ce}(y_i))$ for i=1, ..., n. Moreover, the dynamic schema determination system 106 can select the top k (e.g., one or more) schema labels ($y_i$) with the highest similarity scores ($s_i$) as the determined schema label(s) for the input column c'.

Upon determining a schema label for an input column, the dynamic schema determination system 106 can utilize the schema label to represent the input column. For example, the dynamic schema determination system 106 can modify a header label (or add a header label) using the determined schema label for the input column. Indeed, as mentioned above, the dynamic schema determination system 106 can update a dataset that includes the column by associating the determined schema label with the column.

Additionally, the dynamic schema determination system 106 can include the updated dataset (or the updated column) having the determined schema label in a collection of data (e.g., within the digital data analytics system 104). By doing so, the dynamic schema determination system 106 can receive and standardize datasets or columns to match schema mappings in a larger collection of data. Indeed, by mapping the datasets or columns to schemas, the dynamic schema determination system 106 can easily determine (or evaluate) analytics information from a large collection of data that includes datasets or columns from multiple sources (e.g., uploaded by multiple users as arbitrary columns).

As mentioned above, the dynamic schema determination system 106 can provide (or generate) a graphical user interface to display determined schema labels in correspondence to input columns. For instance, in some embodiments, the dynamic schema determination system 106 provides a graphical user interface to receive a dataset via a client device. Then, the dynamic schema determination system 106 can determine schema labels for columns of the dataset and can display determined schema labels, similarity scores, and columns (or header labels of columns) via a graphical user interface on the client device. For instance, FIGS. 7A and 7B illustrate graphical user interfaces for receiving datasets and for displaying determined schema labels, similarity scores, and columns (or header labels of columns).

Figure 7A:
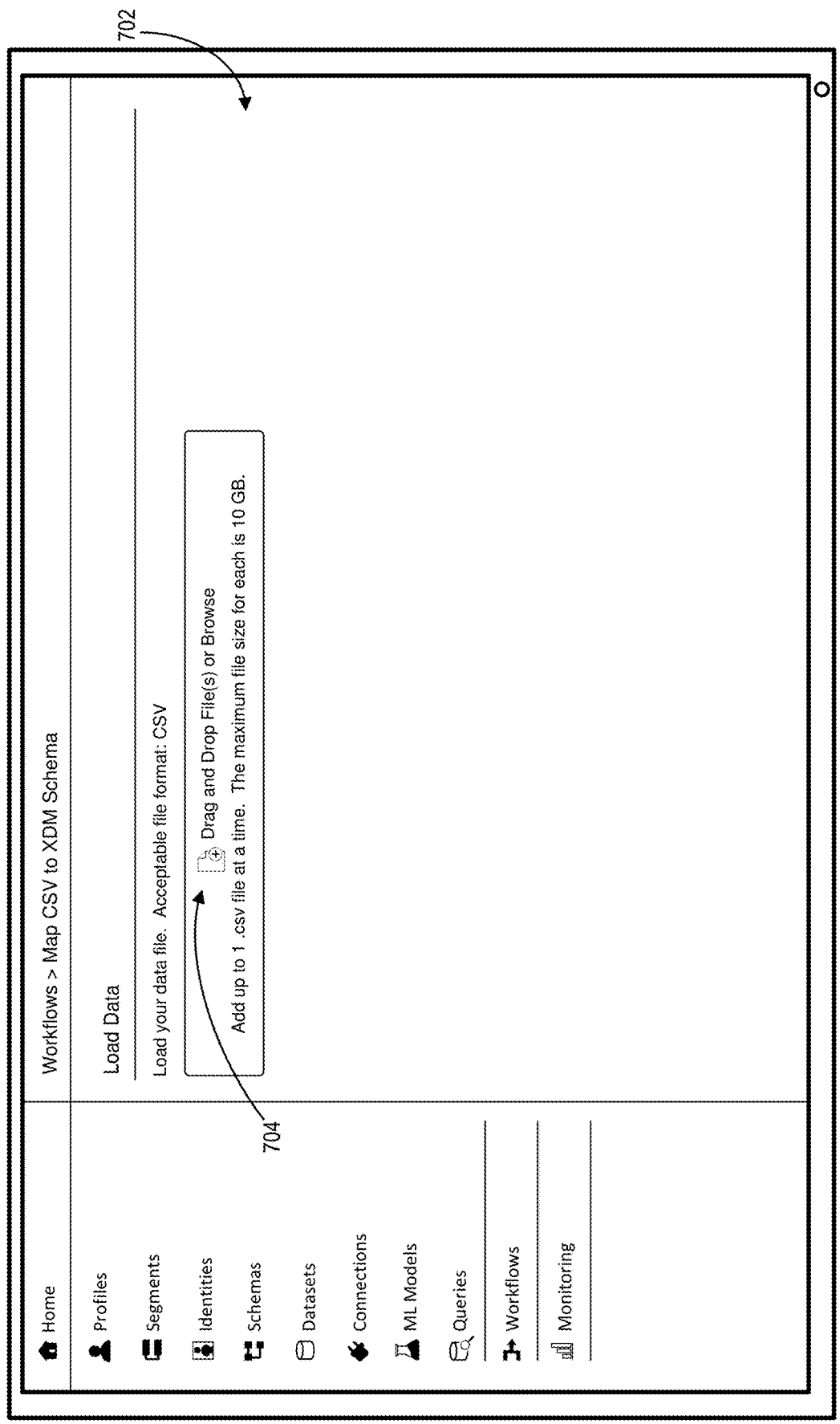

In particular, as shown in FIG. 7A, the dynamic schema determination system 106 can generate a graphical user interface 702 to receive (or identify) datasets from client devices. As illustrated in FIG. 7A, the dynamic schema determination system 106 can display an option 704 to provide a dataset (e.g., a drag and drop file option). Moreover, the dynamic schema determination system 106 can receive any type of data (or file) that can include a dataset (or columns) via a functionality corresponding to the option 704 (e.g., CSV files, flat file, plain text file, HTML, xls, etc.). Furthermore, although the option 704 illustrates a drag and drop option, the dynamic schema determination system 106 can provide any type of data retrieval option via the graphical user interface 702 (e.g., browse computer files, browse cloud-based files, create file, etc.).

Figure 7B:
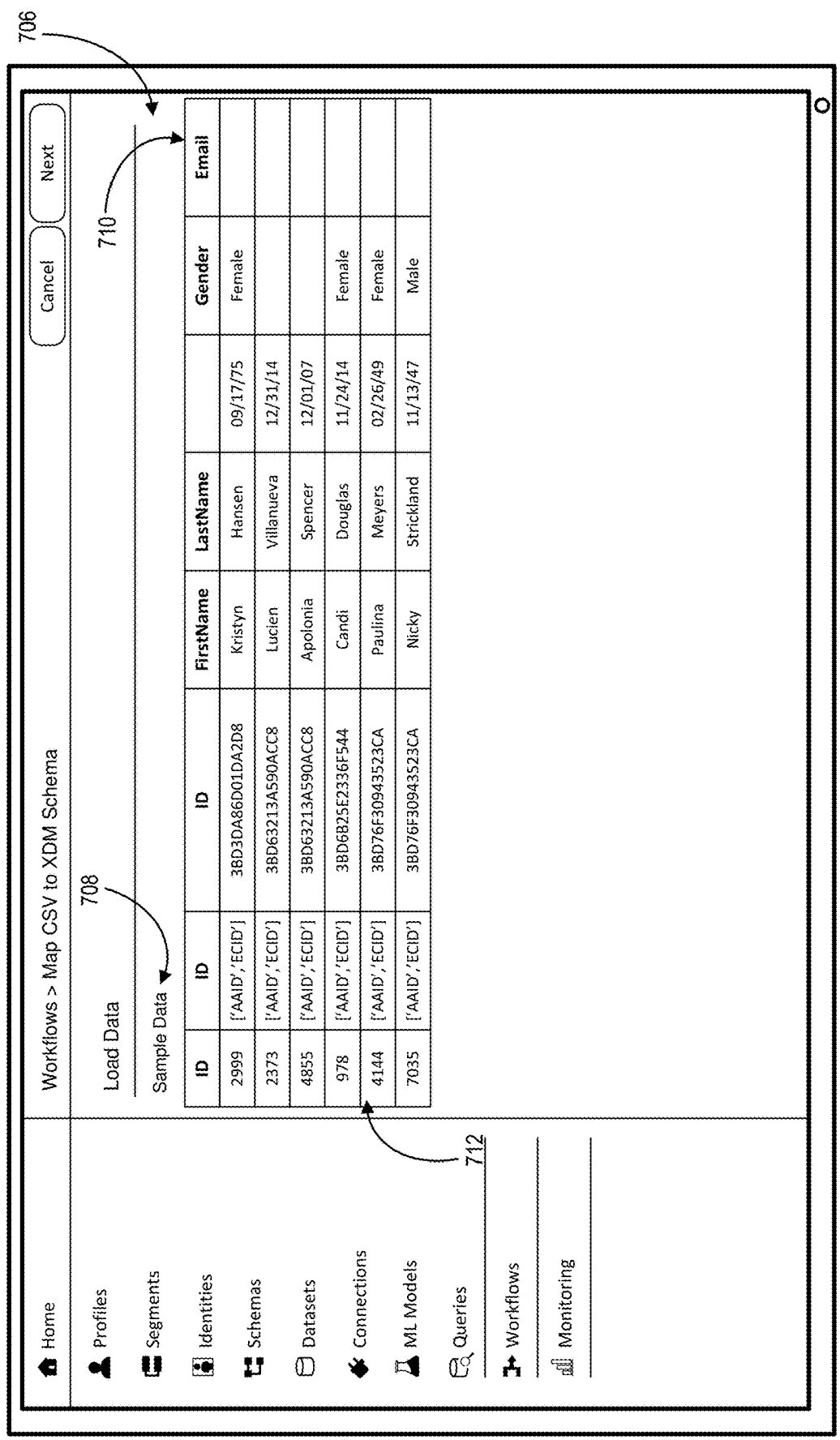

Furthermore, upon identifying a dataset (e.g., receiving a dataset in response to the option 704), shown in FIG. 7B, the dynamic schema determination system 106 can display the dataset via a graphical user interface 706. In particular, FIG. 7B illustrates the dynamic schema determination system 106 displaying a dataset 708 that includes multiple columns (e.g., provided by a user via the graphical user interface 702). For example, as shown in FIG. 7B, the dynamic schema determination system 106 can display header labels 710 and populated column cells 712 from the dataset 708. Indeed, as illustrated in FIG. 7B, the dataset 708 can include columns with missing header labels (e.g., a cell-only column), columns with missing populated column cells (e.g., a header-only column), and columns that include both header labels and populated column cells (e.g., a whole column). The dynamic schema determination system 106 can display any type of dataset with various combinations of columns (and column information) that is identified (or received) from a user in the graphical user interface 706.

Additionally, as described above, the dynamic schema determination system 106 can determine schema labels for a dataset and display the schema labels, header labels (from the input column), and similarity scores in a graphical user interface. For example, FIG. 7C illustrates the dynamic schema determination system 106 providing determined schema labels, header labels (from the dataset 708), and similarity scores in a graphical user interface 713. In particular, as shown in FIG. 7C, the dynamic schema determination system 106 displays header labels 714, schema labels 716, and similarity scores 718 for each column from the dataset 708. Indeed, as shown in FIG. 7C, the dynamic schema determination system 106 displays the schema labels 716 after determining the schema labels in accordance with one or more embodiments herein. Furthermore, as illustrated in FIG. 718, the dynamic schema determination system 106 also displays the similarity scores 718 (between the schema-column pairs) after determining the similarity scores in accordance with one or more embodiments herein (e.g., as a confidence score between 0 and 1).

In addition, the dynamic schema determination system 106 can also provide a schema hierarchy corresponding to determined schema labels for display via a graphical user interface. For instance, as shown in FIG. 7C, the dynamic schema determination system 106 displays a schema hierarchy 720 for the schema labels 716. Indeed, the dynamic schema determination system 106 can provide information within the schema hierarchy such as schema mapping information for the schema labels 716 and data types (e.g., object, string, integer, Boolean, etc.) for the schema labels 716.

Furthermore, in one or more embodiments, the dynamic schema determination system 106 can receive a confirmation from a client device via a graphical user interface displaying determined schema labels for input columns and update a dataset corresponding to the input columns with the determined schema labels. For example, in reference to FIG. 7C, the dynamic schema determination system 106 can receive a confirmation to finalize the schema labels 716 for the columns of the dataset 708. Indeed, in response to receiving a confirmation, the dynamic schema determination system 106 can update the dataset by replacing the header labels of the dataset 708 with the determined schema labels 716.

As also mentioned above, the dynamic schema determination system 106 can also easily (and quickly) manipulate schema label determinations for select columns of a dataset (via overwrite functions). For example, FIG. 7D illustrates the dynamic schema determination system 106 providing a user interface for overwriting schema label determinations for a column of a dataset.

Figure 7D:
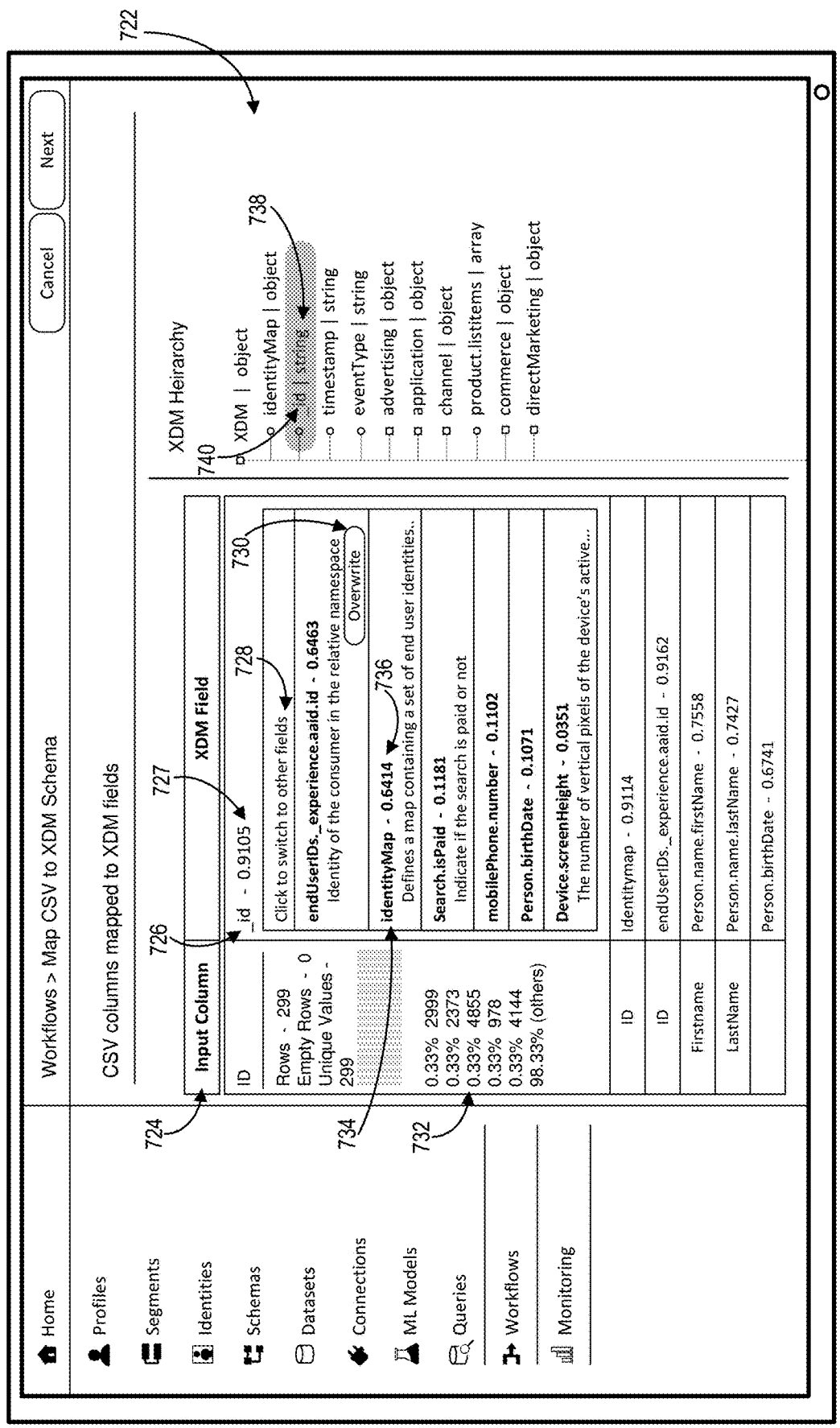

As shown in FIG. 7D, the dynamic schema determination system 106 can generate a graphical user interface 722 that includes selectable options 726 (with a similarity score 727) in connection to the determined schema labels for the input columns 724. Indeed, upon detecting a user interaction (or selection) with the selectable option 726, the dynamic schema determination system 106 can display additional functionalities and information via the graphical user interface 722. In particular, as shown in FIG. 7D, the dynamic schema determination system 106 can display column information 732 in response to detecting a user interaction with the selectable option 726 (e.g., a user selects the first schema label "_id" corresponding to the input column "ID"). As further illustrated in FIG. 7D, the column information 732 can include information corresponding to the selected header label or determined schema label via the selectable option 726. For example, as shown in FIG. 7D, the column information 732 includes information for the number of populated column cells (e.g., rows), number of empty column cells, unique values within the column, and a distribution of various values within the populated column cells.

Additionally, as shown in FIG. 7D, the dynamic schema determination system 106 also displays a sub menu 728 corresponding to a determined schema label in response to detecting the user interaction with the selectable option 726. For example, as illustrated in FIG. 7D, the sub menu 728 displays information related to the determined schema labels (e.g., a description for the schema labels) and additional schema labels determined for the selected column. Indeed, the dynamic schema determination system 106 can provide additional schema labels based on selecting a top k schema labels based on similarity scores as described above.

In addition, as shown in FIG. 7D, upon detecting a user interaction with an additional (or alternate) schema label 734 (having a similarity score 736) in the sub menu 728, the dynamic schema determination system 106 can provide a selectable option 730 to replace (or overwrite) the determined schema label with the selected additional schema label. Indeed, in reference to FIG. 7D, upon detecting a user interaction with the selectable option 730, the dynamic schema determination system 106 can replace a determined schema label with a selected additional schema label for an input column (in accordance with one or more embodiments). Moreover, the dynamic schema determination system 106 can update a dataset to include the selected additional schema label upon detecting a user interaction with the selectable option 730. Indeed, the dynamic schema determination system 106 can display any number of alternate schema labels and corresponding similarity scores as selectable schema labels for a replace (or overwrite) function.

Furthermore, in some embodiments, the dynamic schema determination system 106 utilizes overwrite selections from users (for the determined schema labels) to further train the neural network encoder models. In particular, the dynamic schema determination system 106 can track and collect data related to when determined schema labels are overwritten. Moreover, the dynamic schema determination system 106 can utilize the data for when determined schema labels are overwritten to train the neural network encoder models (e.g., adjust parameters of the encoders).

Additionally, the dynamic schema determination system 106 can also utilize a determined schema label to modify a dataset. In particular, the dynamic schema determination system 106 can identify a data format corresponding to a determined schema label and apply the data format to a populated column cells of a column in a dataset to modify the dataset. For example, upon determining a schema label for a column, the dynamic schema determination system 106 can identify a data format corresponding to the schema label (e.g., a Boolean type, string, integer, array, object, etc.). Subsequently, the dynamic schema determination system 106 can apply the identified data format to one or more populated column cells of the column (by modifying values of the one or more populated column cells to modify a dataset).

As an example, upon identifying that a data format of Boolean corresponds to a schema label determined for a column, the dynamic schema determination system 106 can modify one or more populated column cells of the column (e.g., that may use values such as yes and no) to conform to a Boolean data format corresponding to the determined schema label (e.g., to use values such as true and false). Furthermore, as an example, upon identifying that a data format of a date corresponds to a schema label determined for a column, the dynamic schema determination system 106 can modify one or more populated column cells of the column (e.g., that may use values such as Dec. 12, 2019) to conform to a date data format corresponding to the determined schema label (e.g., to use values such as Dec. 12, 2019). For instance, as shown in FIG. 7D, the dynamic schema determination system 106 displays an identified data format 738 corresponding to a determined schema label 740.

As mentioned above, the dynamic schema determination system 106 can accurately map columns to schema labels. Indeed, experimenters applied an embodiment of the dynamic schema determination system 106 to a customer dataset to determine schema labels for columns of the customer dataset. In particular, the experiments used the customer dataset (which included header-only columns, cell-only columns, and whole columns) to determine schema labels using an example embodiment of the dynamic schema determination system 106. The utilized customer dataset included 9 tables with 33 columns in each table together with 33 unique schema labels. The experimenters randomly split the 9 tables into a training set with 165 columns and a test set with the remaining 132 columns. In order to evaluate the schema label determination performance, the experimenters used four metrics: Accuracy, Mean Reciprocal Rank (MRR), Mean Average Precision (MAP) and Precision@1. Table 1 (below) illustrates the results of the dynamic schema determination system 106 determining schema labels for the columns of the customer dataset utilized in the experiment.

TABLE 1

| Model | Metrics | | | |
| --- | --- | --- | --- | --- |
|  | Accuracy | MRR | MAP | Precision@1 |
| Model | Header-only Matching | | | |
| $g_{sum}(h_c) + g_{sum}(y) + g_{score}(c, y)$ | 0.70455 | 0.78624 | 0.78624 | 0.70455 |
| $g_{gru}(h_c) + g_{gru}(y) + g_{score}(c, y)$ | 0.75000 | 0.82854 | 0.82854 | 0.75000 |
| Model | Cell-only Matching | | | |
| $g_{cnn}(x_c) + g_{sum}(y) + g_{score}(c, y)$ | 0.78030 | 0.88763 | 0.88763 | 0.78030 |
| $g_{cnn}(x_c) + g_{gru}(y) + g_{score}(c, y)$ | 0.75000 | 0.85126 | 0.85126 | 0.75000 |
| Model | Whole-column Matching | | | |
| $G_{ce}(c) + g_{sum}(y) + g_{score}(c, y)$ | 0.84848 | 0.90177 | 0.90177 | 0.84848 |
| $G_{ce}(c) + g_{gru}(y) + g_{score}(c, y)$ | 0.87121 | 0.90909 | 0.90909 | 0.87121 |

Figure 8:
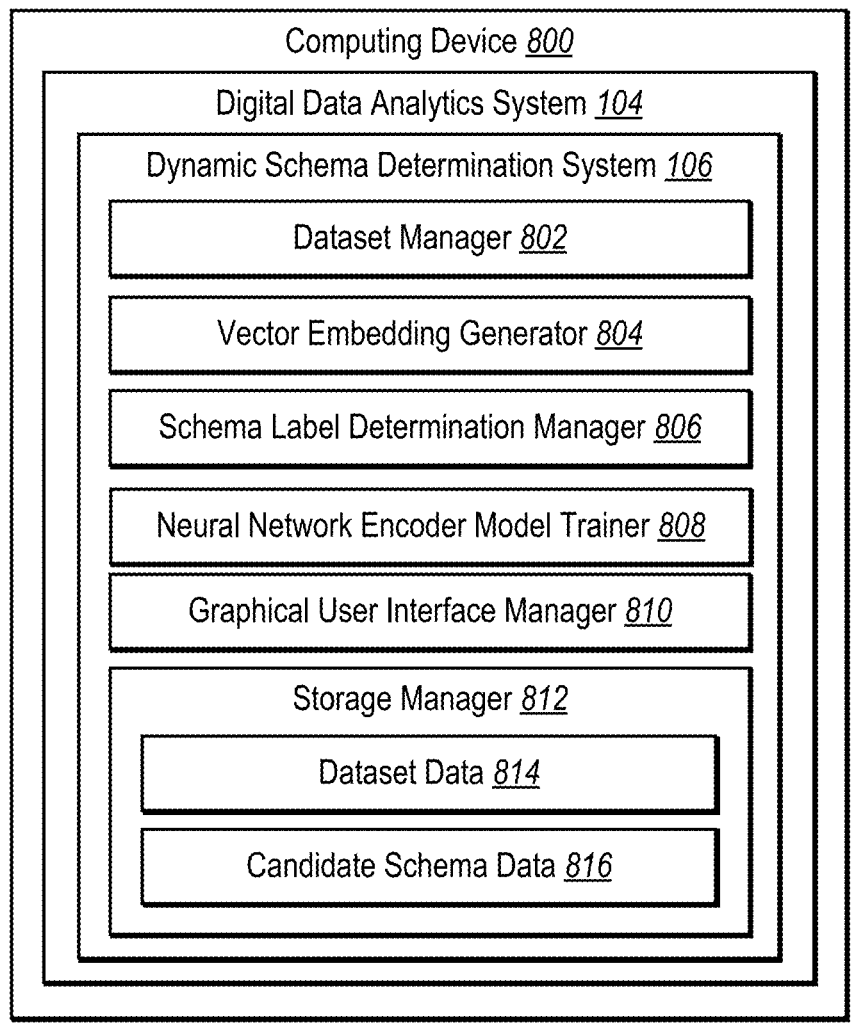
FIG. 8 illustrates a schematic diagram of a dynamic schema determination system in accordance with one or more embodiments.

Turning now to FIG. 8, additional detail will be provided regarding components and capabilities of one embodiment of the dynamic schema determination system. In particular, FIG. 8 illustrates an embodiment of an example dynamic schema determination system 106 executed by a computing device 800 (e.g., the server device(s) 102 and/or the client device 110). As shown by the embodiment in FIG. 8, the computing device 800 can include or host the digital data analytics system 104 and the dynamic schema determination system 106. The dynamic schema determination system 106 can include a dataset manager 802, a vector embedding generator 804, a schema label determination manager 806, a neural network encoder model trainer 808, a graphical user interface manager 810, and a storage manager 812 which can include dataset data 814 and candidate schema data 816.

As just mentioned, and as illustrated in the embodiment in FIG. 8, the dynamic schema determination system 106 can include the dataset manager 802. For example, the dataset manager 802 can identify, create, and/or receive datasets and/or columns as described above (e.g., in relation to FIGS. 2A and 3A). Furthermore, the dataset manager 802 can determine or identify a column input type (e.g., header column type and/or cell column type) for datasets and/or columns as described above (e.g., in relation to FIGS. 3A, 4A, 4B, and 4C).

Moreover, as shown in FIG. 8, the dynamic schema determination system 106 can include the vector embedding generator 804. For instance, the vector embedding generator 804 can selectively utilize neural network encoder models (e.g., header and/or cell neural network encoders) for a column based on an identified column input type for the column as described above (e.g., in relation to FIGS. 3A, 3B, 4A, 4B, and 4C). In addition, the vector embedding generator can generate vector embeddings for columns (e.g., using header labels and/or populated column cells) and/or for schema labels using a selected neural network encoder model as described above (e.g., in relation to FIGS. 3A, 3B, 4A, 4B, and 4C).

Furthermore, as illustrated in FIG. 8, the dynamic schema determination system 106 can include the schema label determination manager 806. For example, the schema label determination manager 806 can determine schema labels for columns using respective schema vector embeddings and column vector embeddings (using cosine similarities) as described above (e.g., in relation to FIGS. 3B, 4A, 4B, 4C, 6A, and 6B). In addition, the schema label determination manager 806 can determine a schema label for a column (based on a similarity score corresponding to schema-column pairs) and update a dataset having the column by using the determined schema label for the column as described above (e.g., in relation to FIGS. 6A and 6B).

Additionally, as shown in FIG. 8, the dynamic schema determination system 106 can include the neural network encoder model trainer 808. For instance, the neural network encoder model trainer 808 can minimize a ranking loss between training data columns and schema labels as described above (e.g., in relation to FIG. 5). Moreover, the neural network encoder model trainer 808 can minimize the ranking loss of one or more neural network encoder models to map columns to schema labels as described above (e.g., in relation to FIG. 5).

Furthermore, as shown in FIG. 8, the dynamic schema determination system 106 can include the graphical user interface manager 810. For example, the graphical user interface manager 810 can display determined (or identified) schema labels, header labels, columns, and/or similarity scores as described above (e.g., in relation to FIGS. 7A, 7B, 7C, and 7D). Additionally, the graphical user interface manager 810 can provide access to functionalities corresponding to the determined (or identified) schema labels (such as an option to replace a schema label) as described above (e.g., in relation to FIGS. 7A, 7B, 7C, and 7D).

Moreover, as illustrated in FIG. 8, the dynamic schema determination system 106 can include the storage manager 812. The storage manager 812 (which can be included on one or more memory devices) can maintain data to perform the one or more functions of the dynamic schema determination system 106. As shown, the storage manager 812 can include dataset data 814 (e.g., datasets, columns, header labels, populated column cells, schema mappings, column vector embeddings, and/or neural network encoder models) and candidate schema data 816 (e.g., schema labels and/or schema vector embeddings).

Each of the components 802-816 of the computing device 800 (e.g., the computing device 800 implementing the dynamic schema determination system 106), as shown in FIG. 8, may be in communication with one another using any suitable communication technologies. It will be recognized that although components 802-816 of the computing device 800 are shown to be separate in FIG. 8, any of components 802-816 may be combined into fewer components, such as into a single facility or module, divided into more components, or configured into different components as may serve a particular embodiment.

The components 802-816 of the computing device 800 can comprise software, hardware, or both. For example, the components 802-816 can comprise one or more instructions stored on a computer-readable storage medium and executable by processors of one or more computing devices. When executed by the one or more processors, the computer-executable instructions of the dynamic schema determination system 106 (e.g., via the computing device 800) can cause a client device and/or a server device to perform the methods described herein. Alternatively, the components 802-816 and their corresponding elements can comprise hardware, such as a special purpose processing device to perform a certain function or group of functions. Additionally, the components 802-816 can comprise a combination of computer-executable instructions and hardware.

Furthermore, the components 802-816 of the dynamic schema determination system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-816 may be implemented as a stand-alone application, such as a desktop or mobile application. Furthermore, the components 802-816 may be implemented as one or more web-based applications hosted on a remote server. The components 802-816 may also be implemented in a suite of mobile device applications or "apps." To illustrate, the components 802-816 may be implemented in an application, including but not limited to, ADOBE EXPEIRENCE PLATFORM, ADOBE ANALYTICS CLOUD, ADOBE ANALYTICS, ADOBE AUDIENCE MANAGER, ADOBE CAMPAIGN, and ADOBE TARGET. "ADOBE," "ADOBE EXPEIRENCE PLATFORM," "ADOBE ANALYTICS CLOUD," "ADOBE ANALYTICS," "ADOBE AUDIENCE MANAGER," "ADOBE CAMPAIGN," and "ADOBE TARGET" are either registered trademarks or trademarks of Adobe Inc. in the United States and/or other countries.

Figure 9:
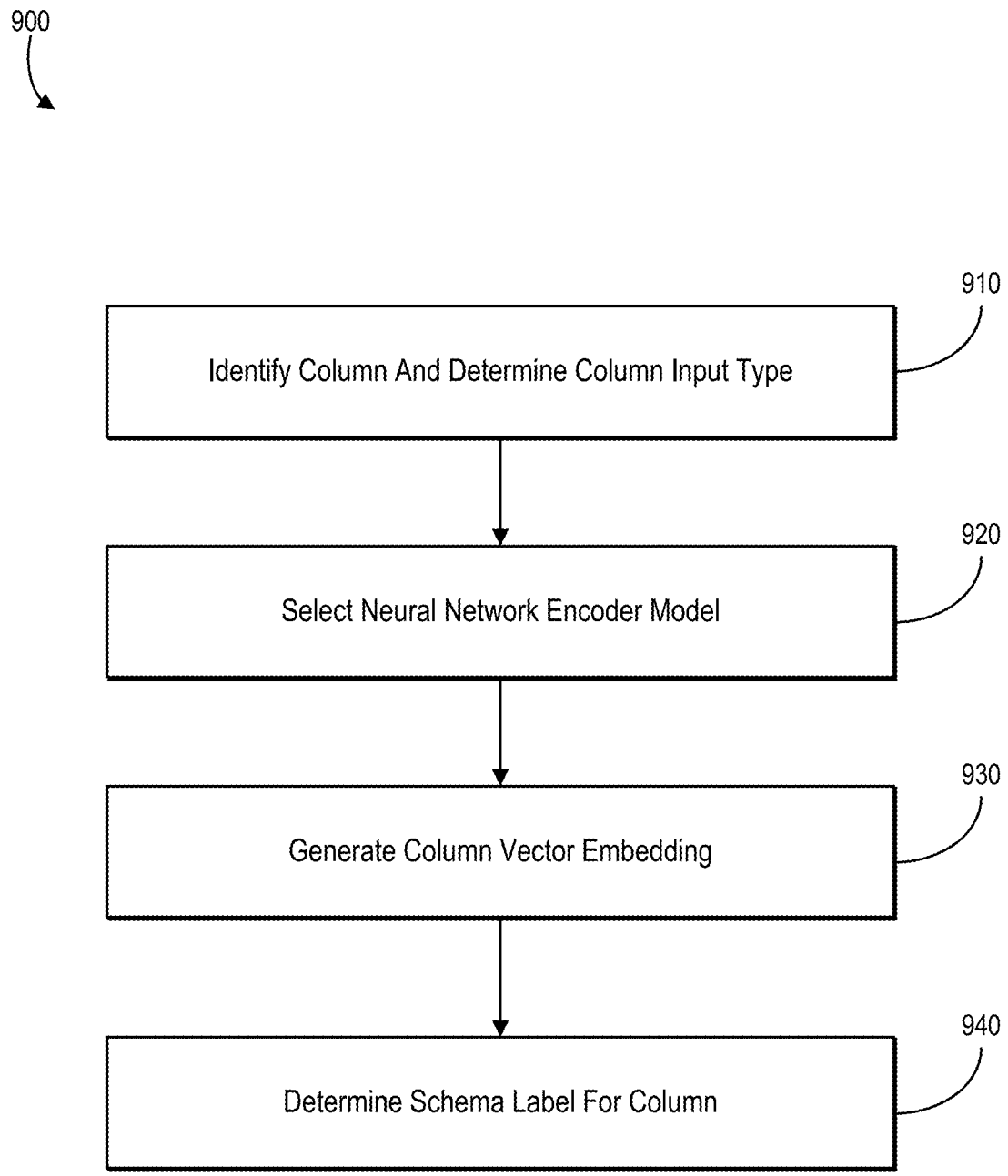
FIG. 9 illustrates a flowchart of a series of acts for dynamically determining schema labels for columns in accordance with one or more embodiments.

FIGS. 1-8, the corresponding text, and the examples provide a number of different methods, systems, devices, and non-transitory computer-readable media of the dynamic schema determination system 106. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned above, FIG. 9 illustrates a flowchart of a series of acts 900 for dynamically determining schema labels for columns in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing (or computer) device to perform the acts of FIG. 9. In some embodiments, a system can perform the acts of FIG. 9 (e.g., a system can include one or more memory devices and/or one or more server devices configured to perform the acts of FIG. 9).

As illustrated in FIG. 9, the series of acts 900 includes an act 910 of identifying a column and determining a column input type. In particular, the act 910 can include identifying a column within a digital dataset. Furthermore, the act 910 can include determining a column input type. For example, a column input type can include at least one of a header column type that includes a header label or a cell column type that includes a populated column cell. Additionally, the act 910 can include determining whether a column includes a header column type that includes a header label and whether a column includes a cell column type that includes a populated column cell.

In addition, the act 910 can include determining that a column includes a header column type and does not include a cell column type. Moreover, the act 910 can include determining that a column includes a cell column type and does not include a header column type. Furthermore, the act 910 can include determining that a column includes a header column type that includes a header label and that the column includes a cell column type that includes a populated column cell.

As illustrated in FIG. 9, the series of acts 900 includes an act 920 of selecting a neural network encoder model. In particular, the act 920 can include selecting a neural network encoder model from a set of neural network encoder models based on whether a column includes a header column type that includes a header label. Furthermore, the act 920 can include selecting a neural network encoder model from a set of neural network encoder models based on whether a column includes a header column type and whether the column includes a cell column type. For example, a set of neural network encoder models can include a header neural network encoder and a cell neural network encoder. Furthermore, a header neural network encoder can include a sequence-based neural network encoder. Moreover, a cell neural network encoder can include a convolutional neural network encoder.

Additionally, the act 920 can include selecting a header neural network encoder upon determining that a column includes a header column type and does not include a cell column type. Furthermore, the act 920 can include selecting a cell neural network encoder upon determining that a column includes a cell column type and does not include a header column type. Moreover, the act 920 can include selecting both a header neural network encoder and a cell neural network encoder upon determining that a column includes a cell column type and includes a header column type.

As illustrated in FIG. 9, the series of acts 900 includes an act 930 of generating a column vector embedding. In particular, the act 930 can include generating a column vector embedding for a column utilizing a selected neural network encoder model. Furthermore, the act 930 can include generating a column vector embedding for a column by utilizing a header neural network encoder (or a sequence-based neural network encoder) with a header label. Additionally, the act 930 can include generating a column vector embedding for a column by utilizing a cell neural network encoder (or a convolutional neural network encoder) with a populated column cell. Moreover, the act 930 can include generating a column vector embedding for a column by: generating a vector embedding for a header label utilizing a header neural network encoder, generating a vector embedding for a populated column cell utilizing a cell neural network encoder, and concatenating the vector embedding for the header label and the vector embedding for the populated column cell. Furthermore, the act 930 can include generating an additional schema vector embedding of an additional schema label utilizing a header neural network encoder.

As illustrated in FIG. 9, the series of acts 900 includes an act 940 of determining a schema label for a column. In particular, the act 940 can include determining a schema label for a column based on a column vector embedding generated utilizing a selected neural network encoder model. Furthermore, the act 940 can include determining a schema label for a column by identifying schema vector embeddings for a plurality of schema labels and comparing a column vector embedding to the schema vector embeddings. For example, schema vector embeddings can be generated utilizing a header neural network encoder (or a sequence-based neural network encoder). Furthermore, the act 940 can include comparing a column vector embedding to schema vector embeddings by determining cosine similarities between the column vector embedding and the schema vector embeddings to generate similarity scores. In addition, the act 940 can include generating an updated dataset using an identified (or determined) schema label and a column.

Additionally, the act 940 can include identifying an additional schema label, where the additional schema label is not utilized in training a sequence-based neural network encoder. Furthermore, the act 940 can include comparing an additional schema vector embedding and a column vector embedding to determine a schema label for a column.

Moreover, the act 940 can include providing a header label and an identified (or determined) schema label for display via a user interface at a client device. Furthermore, the act 940 can include providing a header label, a schema label, and similarity scores for display via a user interface at a client device. Additionally, the act 940 can include generating an updated dataset based on a user interaction with a schema label via a user interface. In addition, the act 940 can include replacing an identified (or determined) schema label with an additional schema label for a column based on a user interaction with the additional schema label via a user interface.

In addition to (or in the alternative to) the acts above, the series of acts 900 can also include a step for identifying a schema label for a column using a column input type. For example, the acts and algorithms described above in relation to FIGS. 3A-3B, 4A-4C, and 6A-6B (e.g., the acts 302-312, 402-422, and 602-612) can comprise the corresponding acts and algorithms (i.e., structure) for performing a step for identifying a schema label for a column using a column input type.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
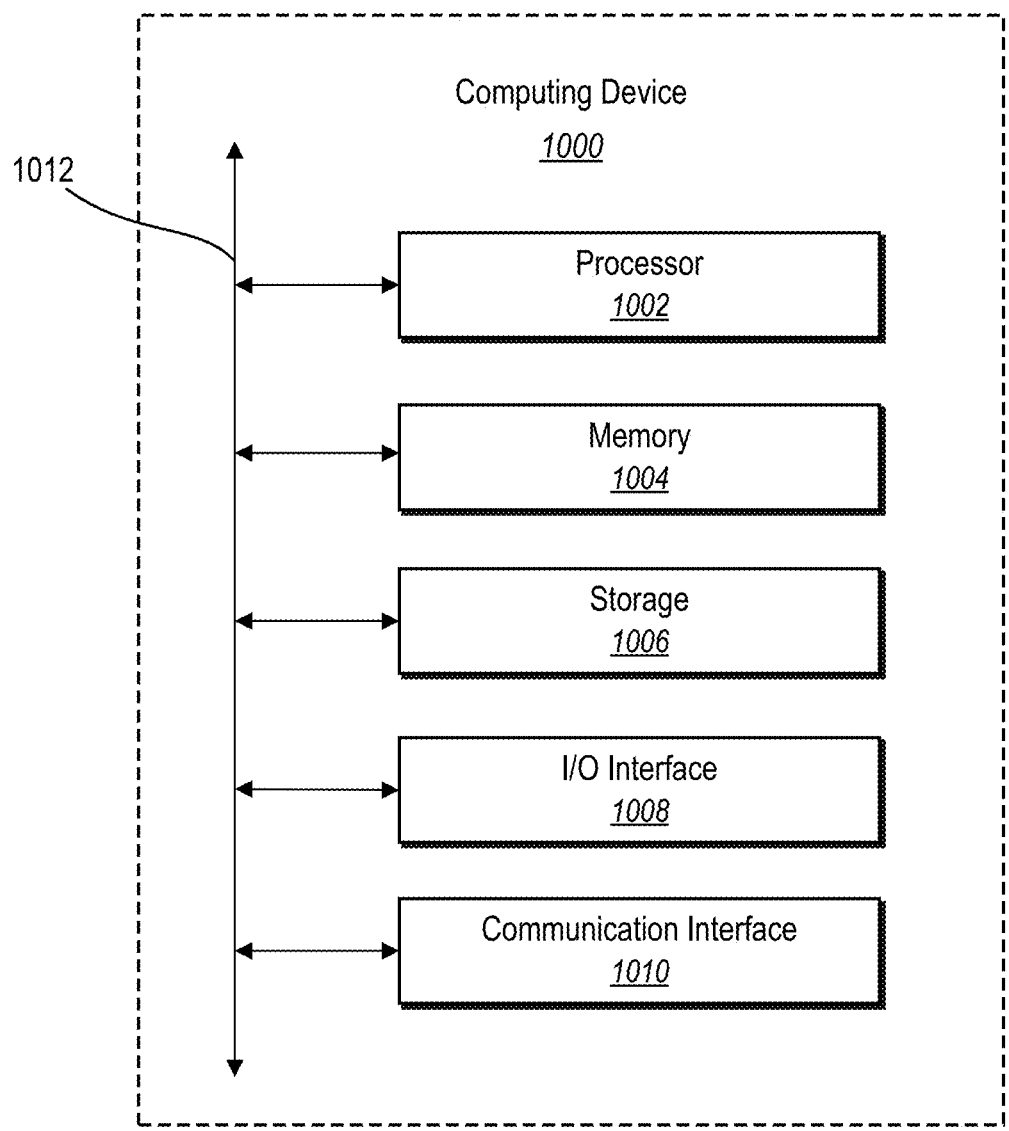
FIG. 10 illustrates a block diagram of an example computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 800, server device(s) 102, and client device 110). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive ("HDD"), flash memory, a Universal Serial Bus ("USB") drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   identifying a column within a digital dataset;
   determining a column input type for the column, wherein the column input type comprises at least one of a header column type that includes a header label or a cell column type that includes a populated column cell;
   performing a step for identifying a schema label for the column using the column input type; and
   generating an updated dataset using the identified schema label and the column.

2. The computer-implemented method of claim 1, further comprising providing the header label and the identified schema label for display via a user interface at a client device.

3. The computer-implemented method of claim 2, further comprising generating the updated dataset based on a user interaction with the schema label via the user interface.

4. The computer-implemented method of claim 3, further comprising replacing the identified schema label with an additional schema label for the column based on a user interaction with the additional schema label via the user interface.

5. A non-transitory computer-readable medium storing instructions that, when executed by at least one processor, cause a computer device to:
   identify a column within a digital dataset;
   determine whether the column comprises a header column type that includes a header label and whether the column comprises a cell column type that includes a populated column cell;
   select a neural network encoder model from a set of neural network encoder models comprising a header neural network encoder and a cell neural network encoder based on whether the column comprises the header column type and whether the column comprises the cell column type;
   generate a column vector embedding for the column utilizing the selected neural network encoder model;
   determine a schema label for the column based on the column vector embedding generated utilizing the selected neural network encoder model; and
   generate an updated dataset using the schema label and the column.

6. The non-transitory computer-readable medium of claim 5, further storing instructions that, when executed by the at least one processor, cause the computer device to:
   select the header neural network encoder upon determining that the column comprises the header column type and does not comprise the cell column type, wherein the header neural network encoder comprises a sequence-based neural network encoder; and
   generate the column vector embedding for the column by utilizing the header neural network encoder with the header label.

7. The non-transitory computer-readable medium of claim 5, further storing instructions that, when executed by the at least one processor, cause the computer device to:

select the cell neural network encoder upon determining that the column comprises the cell column type and does not comprise the header column type, wherein the cell neural network encoder comprises a convolutional neural network encoder; and generate the column vector embedding for the column by utilizing the cell neural network encoder with the populated column cell.

8. The non-transitory computer-readable medium of claim 5, further storing instructions that, when executed by the at least one processor, cause the computer device to:

determine that the column comprises the header column type that includes the header label and that the column comprises the cell column type that includes the populated column cell; and generating the column vector embedding for the column by:

generating a vector embedding for the header label utilizing the header neural network encoder;

generating a vector embedding for the populated column cell utilizing the cell neural network encoder; and concatenating the vector embedding for the header label and the vector embedding for the populated column cell.

9. The non-transitory computer-readable medium of claim 5, further storing instructions that, when executed by the at least one processor, cause the computer device to determine the schema label for the column by:

identifying schema vector embeddings for a plurality of schema labels, the schema vector embeddings generated utilizing the header neural network encoder; and comparing the column vector embedding to the schema vector embeddings.

10. The non-transitory computer-readable medium of claim 9, further storing instructions that, when executed by the at least one processor, cause the computer device to compare the column vector embedding to the schema vector embeddings by determining cosine similarities between the column vector embedding and the schema vector embeddings to generate similarity scores.

11. The non-transitory computer-readable medium of claim 10, further storing instructions that, when executed by the at least one processor, cause the computer device to:

provide the header label, the schema label, and the similarity scores for display via a user interface at a client device; and generate the updated dataset based on a user interaction with the schema label via the user interface.

12. The non-transitory computer-readable medium of claim 5, further storing instructions that, when executed by the at least one processor, cause the computer device to:

identify an additional schema label, not utilized in training the header neural network encoder;

generate an additional schema vector embedding of the additional schema label utilizing the header neural network encoder; and compare the additional schema vector embedding and the column vector embedding to determine the schema label for the column.

13. A system comprising:

one or more memory devices comprising a digital dataset comprising a column, a plurality of schema labels, and a set of neural network encoder models comprising a header neural network encoder and a cell neural network encoder; and one or more server devices configured to cause the system to:

select a neural network encoder model from the set of neural network encoder models based on whether the column comprises a header column type that includes a header label; and determine a schema label from the plurality of schema labels for the column by:

generating a column vector embedding for the column utilizing the selected neural network encoder model;

identifying schema vector embeddings for the plurality of schema labels, the schema vector embeddings generated utilizing the header neural network encoder; and comparing the column vector embedding to the schema vector embeddings.

14. The system of claim 13, wherein the one or more server devices are configured to cause the system to select the neural network encoder model from the set of neural network encoder models based on whether the column comprises the header column type that includes the header label and whether the column comprises a cell column type that includes a populated column cell.

15. The system of claim 14, wherein the one or more server devices are configured to cause the system to:

select the header neural network encoder upon determining that the column comprises the header column type and does not comprise the cell column type, wherein the header neural network encoder comprises a sequence-based neural network encoder; and generate the column vector embedding for the column by utilizing the header neural network encoder with the header label.

16. The system of claim 14, wherein the one or more server devices are configured to cause the system to:

select the cell neural network encoder upon determining that the column comprises the cell column type and does not comprise the header column type, wherein the cell neural network encoder comprises a convolutional neural network encoder; and generate the column vector embedding for the column by utilizing the cell neural network encoder with the populated column cell.

17. The system of claim 14, wherein the one or more server devices are configured to cause the system to:

determine that the column comprises the header column type that includes the header label and that the column comprises the cell column type that includes the populated column cell; and generating the column vector embedding for the column by:

generating a vector embedding for the header label utilizing the header neural network encoder;

generating a vector embedding for the populated column cell utilizing the cell neural network encoder; and concatenating the vector embedding for the header label and the vector embedding for the populated column cell.

18. The system of claim 13, wherein the one or more server devices are configured to cause the system to generate an updated dataset using the schema label and the column.

19. The system of claim 13, wherein the one or more server devices are configured to cause the system to:

compare the column vector embedding to the schema vector embeddings by determining cosine similarities between the column vector embedding and the schema vector embeddings to generate similarity scores;

provide the header label, the schema label, and the similarity scores for display via a user interface at a client device; and generate an updated dataset based on a user interaction with the schema label via the user interface.

20. The system of claim 13, wherein the one or more server devices are configured to cause the system to:

identify an additional schema label, not utilized in training the header neural network encoder;

generate an additional schema vector embedding of the additional schema label utilizing the header neural network encoder; and compare the additional schema vector embedding and the column vector embedding to determine the schema label for the column.

\* \* \* \* \*